US010520008B2

(12) United States Patent
Yoshida et al.

(10) Patent No.: US 10,520,008 B2
(45) Date of Patent: Dec. 31, 2019

(54) SCREW MEMBER, FASTENING STRUCTURE, AND CONNECTION STRUCTURE FOR SOLAR PANEL FLOAT

(71) Applicant: KYORAKU CO., LTD., Kyoto-shi, Kyoto (JP)

(72) Inventors: Kohichirou Yoshida, Tokyo (JP); Yoshinori Motohashi, Osaka (JP)

(73) Assignee: KYORAKU CO., LTD., Kyoto-shi, Kyoto (JP)

( * ) Notice: Subject to any disclaimer, the term of this patent is extended or adjusted under 35 U.S.C. 154(b) by 357 days.

(21) Appl. No.: 15/128,528

(22) PCT Filed: Jan. 28, 2015

(86) PCT No.: PCT/JP2015/052342
§ 371 (c)(1),
(2) Date: Sep. 23, 2016

(87) PCT Pub. No.: WO2015/151567
PCT Pub. Date: Oct. 8, 2015

(65) Prior Publication Data
US 2017/0108030 A1    Apr. 20, 2017

(30) Foreign Application Priority Data
Mar. 31, 2014    (JP) .................................. 2014-071465

(51) Int. Cl.
*F16B 37/04*    (2006.01)
*F16B 41/00*    (2006.01)
(Continued)

(52) U.S. Cl.
CPC .......... *F16B 41/002* (2013.01); *F16B 35/041* (2013.01); *F16B 37/043* (2013.01);
(Continued)

(58) Field of Classification Search
CPC .... F16B 41/002; F16B 35/041; F16B 37/043; B63B 3/06; B63B 2035/4453
(Continued)

(56) References Cited

U.S. PATENT DOCUMENTS 3,782,437 A * 1/1974 Seckerson ............ B60Q 1/0683
411/107
5,332,346 A * 7/1994 Shinjo .................... F16B 1/0071
411/107
(Continued)

FOREIGN PATENT DOCUMENTS

CN    202170918 U    3/2012
DE    4117231 A1    12/1991
(Continued)

OTHER PUBLICATIONS

Jan. 10, 2018 Office Action issued in Chinese Patent Application No. 201580018054.3.
(Continued)

*Primary Examiner* — Gary W Estremsky
(74) *Attorney, Agent, or Firm* — Maier & Maier, PLLC

(57) ABSTRACT

A screw member, a fastening structure, and a connection structure for a solar panel float which can facilitate the fastening operation performed by a screw. A pair of screw members is provided with a male screw member and a female screw member. One of the male screw member and the female screw member has a body portion at least partly inserted into a through-hole provided in an object to be fastened, and a temporary fixing portion provided adjacent to an end of the body portion and locked in the object to be fastened so as to prevent the body portion from deviating from the through-hole during a fastening operation.

13 Claims, 29 Drawing Sheets

(51) Int. Cl.
    *F16B 35/04*     (2006.01)
    *F24S 20/70*     (2018.01)
    *F24S 25/11*     (2018.01)
    *F24S 25/65*     (2018.01)
    *F24S 80/00*     (2018.01)

(52) U.S. Cl.
    CPC ............. *F24S 20/70* (2018.05); *F24S 25/11* (2018.05); *F24S 25/65* (2018.05); *F24S 2080/015* (2018.05); *Y02E 10/47* (2013.01)

(58) Field of Classification Search
    USPC .................................................. 411/107, 182
    See application file for complete search history.

(56) References Cited

U.S. PATENT DOCUMENTS

| | | | | |
|---|---|---|---|---|
| 5,407,310 | A * | 4/1995 | Kassouni | B29C 70/76 29/525.02 |
| 5,413,442 | A * | 5/1995 | Grey | E01B 7/10 238/262 |
| 5,531,554 | A * | 7/1996 | Jeanson | A61B 17/8605 411/107 |
| 5,616,052 | A * | 4/1997 | Pan | F16B 37/043 411/182 |
| 5,741,101 | A * | 4/1998 | Gulistan | F16B 9/023 411/107 |
| 5,743,691 | A * | 4/1998 | Donovan | B23P 19/062 29/432.1 |
| 5,906,172 | A * | 5/1999 | Kordes | B63B 3/06 114/267 |
| 6,375,499 | B1 * | 4/2002 | Lin | F16B 37/048 411/182 |
| 6,457,924 | B1 * | 10/2002 | Wallace | F16B 37/02 174/58 |
| 6,729,244 | B2 * | 5/2004 | Cattaneo | A47B 13/02 108/155 |
| 7,393,169 | B2 * | 7/2008 | Süßenbach | F16B 37/067 411/183 |
| 8,292,562 | B2 * | 10/2012 | Chiu | F16B 35/041 411/107 |
| 2007/0144424 | A1 * | 6/2007 | Strong | E02B 3/064 114/266 |
| 2009/0133732 | A1 * | 5/2009 | Hsia | F24S 25/20 136/206 |
| 2012/0305051 | A1 * | 12/2012 | Kokotov | B63B 21/50 136/246 |
| 2013/0145127 | A1 * | 6/2013 | Hardage | G06F 1/3234 712/214 |
| 2015/0007872 | A1 * | 1/2015 | Cap | E04D 11/005 136/251 |
| 2015/0162866 | A1 * | 6/2015 | Yun | H02S 20/00 114/264 |
| 2016/0368577 | A1 * | 12/2016 | Gaveau | B63B 35/38 |

FOREIGN PATENT DOCUMENTS

| | | |
|---|---|---|
| JP | S40-9933 Y1 | 4/1965 |
| JP | S44-424 Y1 | 1/1969 |
| JP | H06-264910 A | 9/1994 |
| JP | 2000-240628 A | 9/2000 |
| JP | 2001-221219 A | 8/2001 |
| JP | 2008-057660 A | 3/2008 |
| JP | 4418025 B1 | 2/2010 |
| JP | 2013-124766 A | 6/2013 |
| JP | 2013-209994 A | 10/2013 |

OTHER PUBLICATIONS

Apr. 7, 2015 International Search Report issued in International Patent Application No. PCT/JP2015/052342.

Nov. 26, 2018 Office Action issued in Chinese Application No. 201580018054.3.

* cited by examiner

SCREW MEMBER, FASTENING STRUCTURE, AND CONNECTION STRUCTURE FOR SOLAR PANEL FLOAT

TECHNICAL FIELD

The invention relates to a screw member, a fastening structure and a connection structure for a solar panel float.

BACKGROUND OF THE INVENTION

Conventionally, various fastening techniques using a screw member have been proposed (e.g., Patent Document 1).

Patent Document 1 discloses a bolt-and-nut fastening assembly for fastening two objected to be fastened by meshing the bolt with the nut. In general, if such a fastening assembly is used, the bolt meshes with the nut to sandwich the two objects to be fastened between a head portion of the bolt and a seat surface of the nut. As such, the two objects are fastened to each other.

However, during such a fastening operation, an operator needs to rotate either of the bolt or the nut with a tool and the like while holding it by hand, which becomes burdensome to the operator.

CITATION LIST

Patent Literature

[Patent Document 1] Japanese Patent No. 4418025(B)

SUMMARY OF THE INVENTION

The invention has been made in view of such circumstances, and provides a screw member, a fastening structure, and a connection structure for a solar panel float which can facilitate the fastening operation performed by a screw.

The invention provides the following:

(1) As a first aspect of the invention, there is provided a pair of screw members, which has a male screw member and a female screw member. One of the male screw member and the female screw member has a body portion at least partly inserted into a through-hole provided in an object to be fastened, and a temporary fixing portion provided adjacent to an end of the body portion and locked in the object to be fastened so as to prevent the body portion from deviating from the through-hole during a fastening operation.

(2) In the above (1), the female screw member may have the temporary fixing portion, and the temporary fixing portion may be provided adjacent to a leading end of the body portion in an insertion direction where the body portion is inserted.

(3) In the above (2), the temporary fixing portion may have a deformable portion which is elastically inwardly deformable in a perpendicular direction perpendicular to the insertion direction, and a locking portion which outwardly projects from a leading end of the deformable portion in the perpendicular direction so as to be locked in an opening of the through-hole.

(4) In the above (2) or (3), a plurality of the temporary fixing portions may be arranged at substantially regular intervals in a circumferential direction of the body portion.

(5) In any one of the above (2) to (4), the body portion may have a rotation prevention configured to prevent a rotation of the body portion when the male screw member is threaded.

(6) In the above (5), the body portion may have a projection formed on an outer peripheral surface of the body portion in the insertion direction, and the projection may be press-fitted into a groove portion provided in the through-hole to prevent the rotation of the body portion.

(7) In the above (6), a plurality of the projections may be arranged at substantially regular intervals in a circumferential direction of the body portion.

(8) In the above (5), the body portion may have a non-circular outer shape corresponding to the through-hole having a non-circular shape to prevent the rotation of the body portion.

(9) In the above (8), the body portion may have a substantially tetragonal outer shape.

(10) In any one of the above (2) to (9), the female screw member may be formed by a synthetic resin molding.

(11) In any one of the above (2) to (9), the body portion may have a metallic insert part having a female screw, and a synthetic resin molding formed to surround the metallic insert part.

(12) In any one of the above (2) to (9), the body portion may have a press-processed product which is formed by bending a metallic plate.

(13) In the above (12), the body portion may have a part which has a female screw and is joined to the press-processed product.

(14) In the above (1), the male screw member may have the temporary fixing portion and the temporary fixing portion may be provided adjacent to an end of the body portion opposite to a leading end of the body portion in an insertion direction where the body portion is inserted.

(15) In the above (14), the temporary fixing portion may have a deformable portion which is elastically inwardly deformable in a perpendicular direction perpendicular to the insertion direction, and a locking portion outwardly projecting from a leading end of the deformable portion in the perpendicular direction to be locked in an opening of the through-hole.

(16) In the above (14) or (15), a plurality of the temporary fixing portions may be arranged at substantially regular intervals in a circumferential direction of the body portion.

(17) In the above (15) or (16), the locking portion may have a barb portion at a leading end thereof and the barb portion may be locked in a projection which is formed in an inner edge of the opening of the through-hole.

(18) In any one of the above (14) to (17), the body portion may have a guide portion formed as a smooth cylindrical surface in a leading end thereof to facilitate an insertion of the female screw member.

(19) As a second aspect of the invention, there is provided a fastening structure for fastening a plurality of objects to be fastened by a pair of screw members, which has a male screw member threaded from a first object to be fastened out of the plurality of objects to be fastened, and a female screw member according to any of the above (2)-(13), coupled to a through-hole provided in a second object to be fastened out of the plurality of objects to be fastened and meshing with the male screw member.

(20) As a third aspect of the invention, there is provided a fastening structure for fastening a plurality of objects to be fastened by a pair of screw members, which has a female screw member threaded from a first object to be fastened out of the plurality of objects to be fastened, and a male screw member according to any of the above (14)-(18), coupled to a through-hole provided in a second object to be fastened out of the plurality of objects to be fastened and meshing with the female screw member.

(21) In the above (19) or (20), the plurality of objects to be fastened may be a plurality of solar panel floats.

The invention can provide a screw member, a fastening structure and a connection structure for a solar panel float, which allow for easy fastening operation by means of a screw.

DETAILED DESCRIPTION OF THE INVENTION

With reference to the accompanying drawings, embodiments of the invention (hereinafter, referred to as "embodiments") will be hereinafter described in detail. Moreover, the same reference sign is assigned to the same elements throughout the description of the embodiments. Moreover, throughout the embodiment and drawings, the term "front" indicates "rear" direction and the term "back" indicates "forward" direction, when the front side of the inclined solar panel is viewed in a horizontal direction. The terms, "left" and "right" respectively indicate "left" direction and "right" direction, when the front side of the inclined solar panel is viewed in the horizontal direction.

(Overall Configuration of Solar Panel Float 10)

Prior to explaining a fastening structure in accordance with this embodiment (i.e., fastening structures in accordance with first and second embodiments which will be described later), the configuration of a solar panel float 10 to be fastened is hereinafter explained with reference to FIGS. 1-3.

Figure 1:
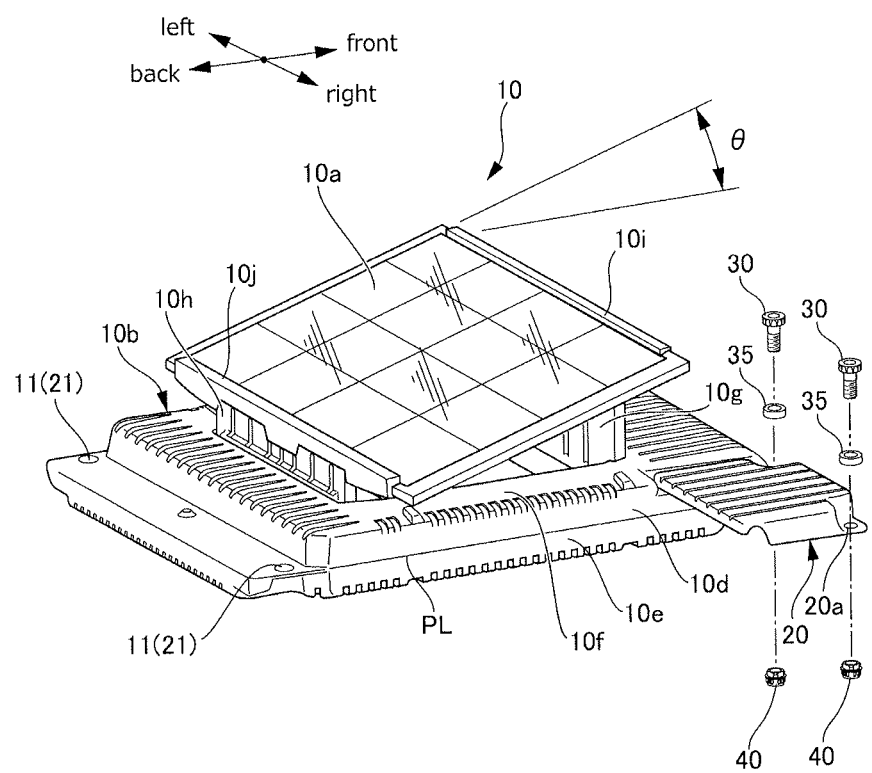
FIG. 1 is a perspective view of an embodiment of a solar panel float.

As shown in FIG. 1, the solar panel float 10 is a float for mounting a solar panel 10a having a substantially tetragonal shape (in this embodiment, a substantially square shape) on water such as ponds and lakes. Due to the solar panel float 10 the solar panel 10a can be mounted on the water such that it is inclined at an inclination angle θ with respect to a horizontal direction. The inclination angle θ of the solar panel 10a is set to optimum angle for electricity generation depending on the region, and etc.

Figure 2:
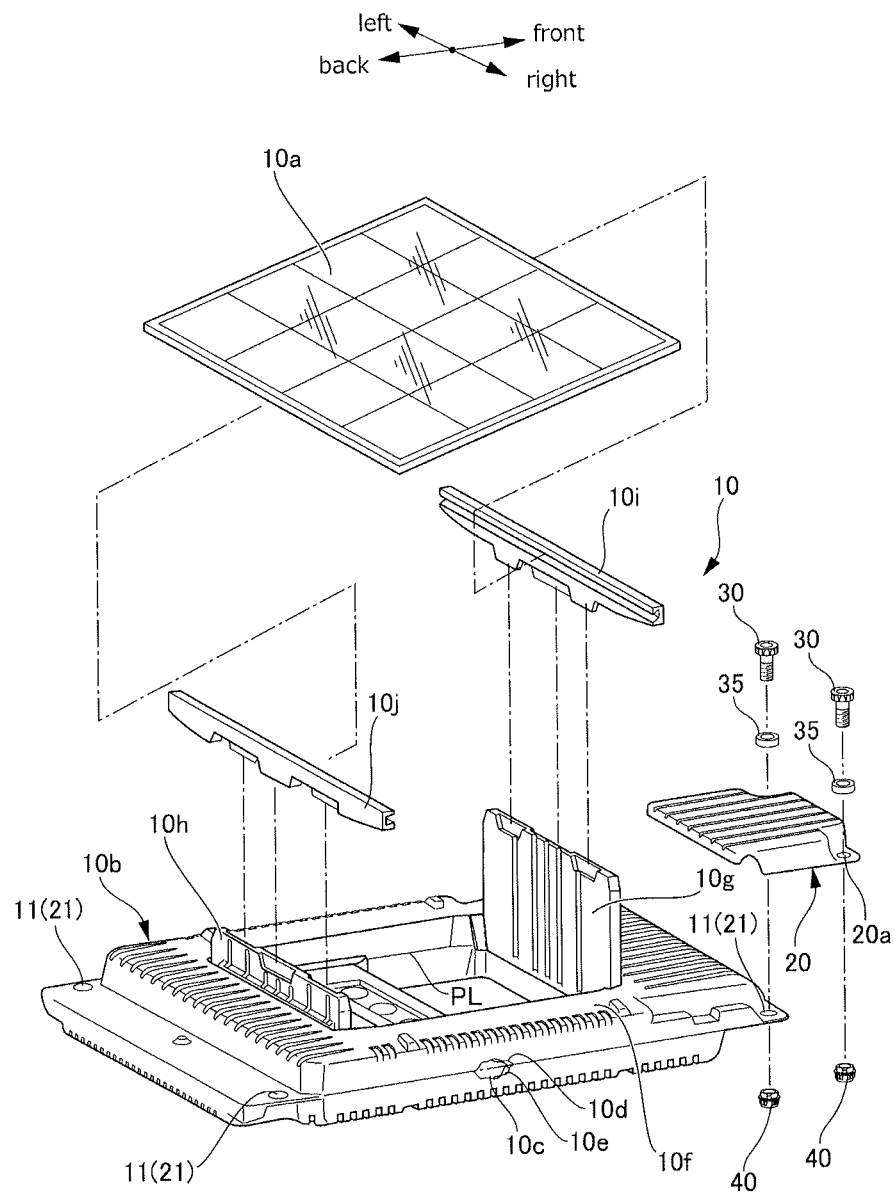
FIG. 2 is an exploded perspective view of the solar panel float of FIG. 1.

As shown in FIG. 2, the solar panel float 10 has a hollow float body 10b formed of synthetic resin. The float body 10b is manufactured, for example, by a blow molding process where a tubular parison in a molten state is inflated with being nipped by a plurality of split molds. As molding material various synthetic may be used. For example, polyolefin resin such as polyethylene and polypropylene may be used.

The float body 10b has a layered structure of opposed upper and lower walls 10d and 10e with a hollow portion 10c interposed between the opposed upper and lower walls 10d, 10e. The upper wall 10d and the lower wall 10e are joined (i.e., welded) at a parting line PL thereby forming a closed hollow portion 10c.

The manufacture of the float body 10b is not particularly limited to the afore-mentioned blow molding process. For example, two molten sheets, instead of the tubular parison, may be disposed between a pair of split molds, and by sucking a closed space between the sheets and the split molds, the float body having the hollow portion interposed between two sheets may be manufactured. In such a molding process, foam material as a core material can be easily inserted between the two sheets thereby enhancing the rigidity of the float body thus obtained.

The float body 10b has an annular float portion 10f, and first and second support plate portions 10g and 10h which are formed interiorly of the annular front portion 10f to support the solar panel 10a. Each of the first and second support plate portions 10g and 10h has a substantially tetragonal shape (in the embodiment, a substantially rectangular shape in the lateral direction). Moreover, the solar panel float 10 has first and second mount members 10i and 10j capable of mounting the solar panel 10a thereto.

Figure 3:
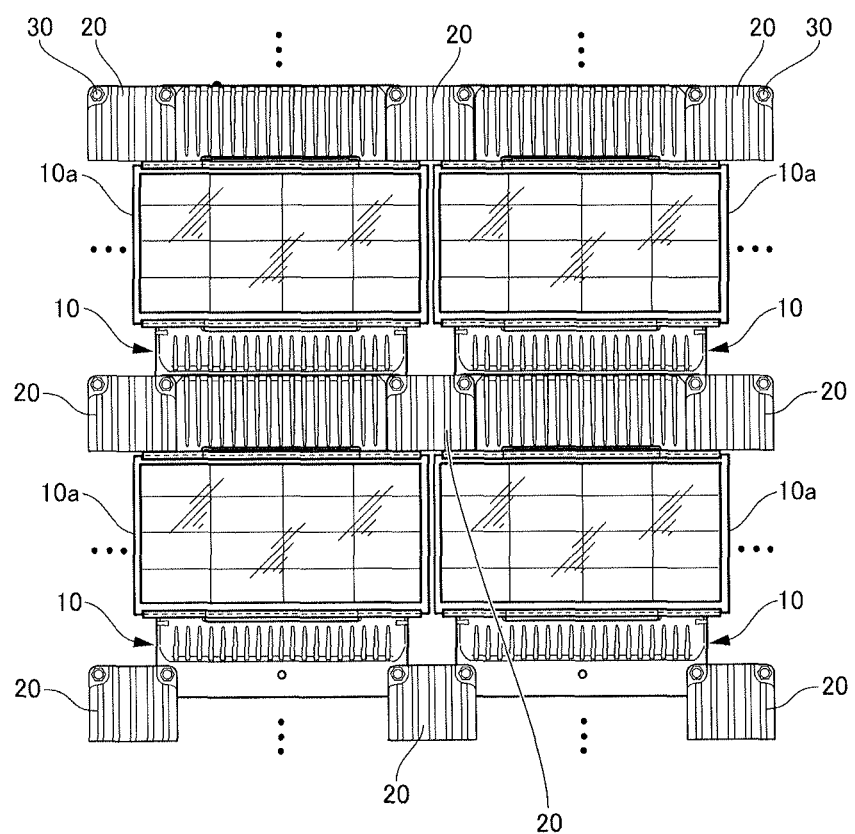
FIG. 3 is a plan view of a plurality of the solar panel floats connected to each other.

As shown in FIG. 3, a plurality of the solar panel floats 10 can be arranged in the longitudinal direction and the lateral direction on the water so as to densely mount a plurality of the solar panels 10a. Two neighboring solar panel floats 10 are fastened by a female screw member 40 and a male screw member 30. Moreover, two neighboring solar panel floats 10 may also be connected through a connection member 20 (i.e., an example of an object to be fastened in accordance with the embodiment) which is fastened by both of the female screw member 40 and the male screw member 30. Due to an anchor (not shown), each solar panel float 10 can be stopped at a certain place on the water. In the following description, when separately describing two neighboring solar panel floats 10, one of the two neighboring solar panel floats may be indicated by the "solar panel float 10A", and the other of the two neighboring solar panel floats may be indicated by the "solar panel float 10B".

Fastening Structure in Accordance with the First Embodiment

Figure 4:
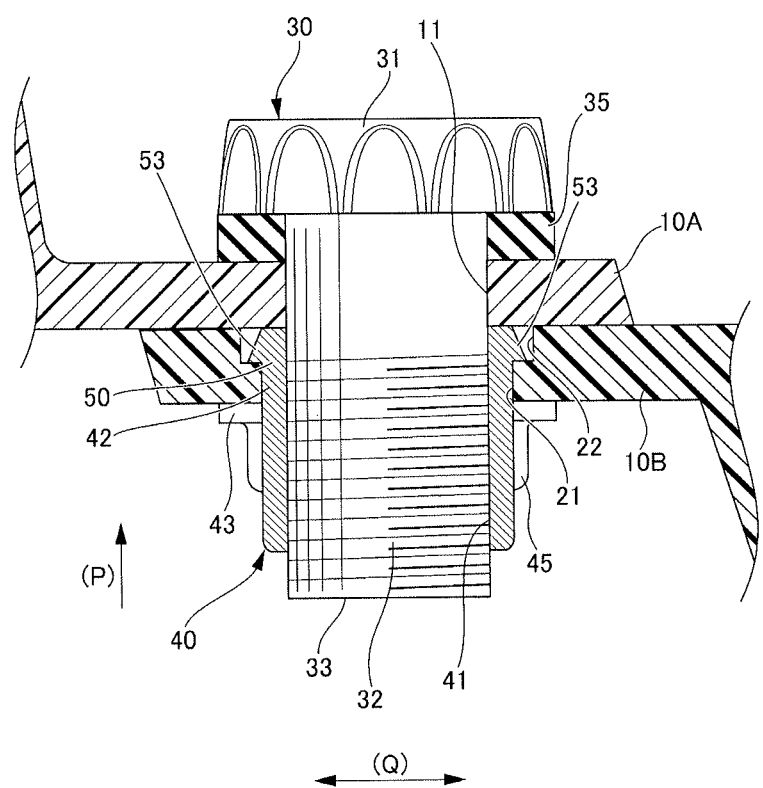
FIG. 4 is a cross-sectional view of a fastening structure in accordance with a first embodiment of the invention.

The fastening structure in accordance with the first embodiment will be hereinafter described with reference to FIGS. 4-8. As shown in FIG. 4, the fastening structure in accordance with the first embodiment is a connection structure for the solar panel float and fastens a portion where two neighboring solar panel floats 10A, 10B overlap. In this regard, the two neighboring solar panel floats 10A, 10B may constitute a plurality of objects to be fastened in accordance with the embodiment of the invention, and correspond to the first object to be fastened and the second object to be fastened respectively. Fastening structure has a first through-hole 11 provided in one of the solar panel float 10A, a second through-hole 21 provided in the other solar panel float 10B to match the first through-hole 11, the male screw member 30 and the female screw member 40. The male screw member 30 and the female screw member 40 correspond to "a pair of screw members" in accordance with the embodiment of the invention.

The male screw member 30 is firstly threaded into the first through-hole 11. While the type, material and shape of the male screw member 30 are arbitrary, the male screw member 30 may be selected from various bolts (e.g., a resin bolt). In this embodiment, the male screw member 30 may have a head portion 31 and a shaft portion 33 which is provided on the back surface of the head portion 31 and has a male screw 32 on an outer peripheral surface thereof.

Figure 5:
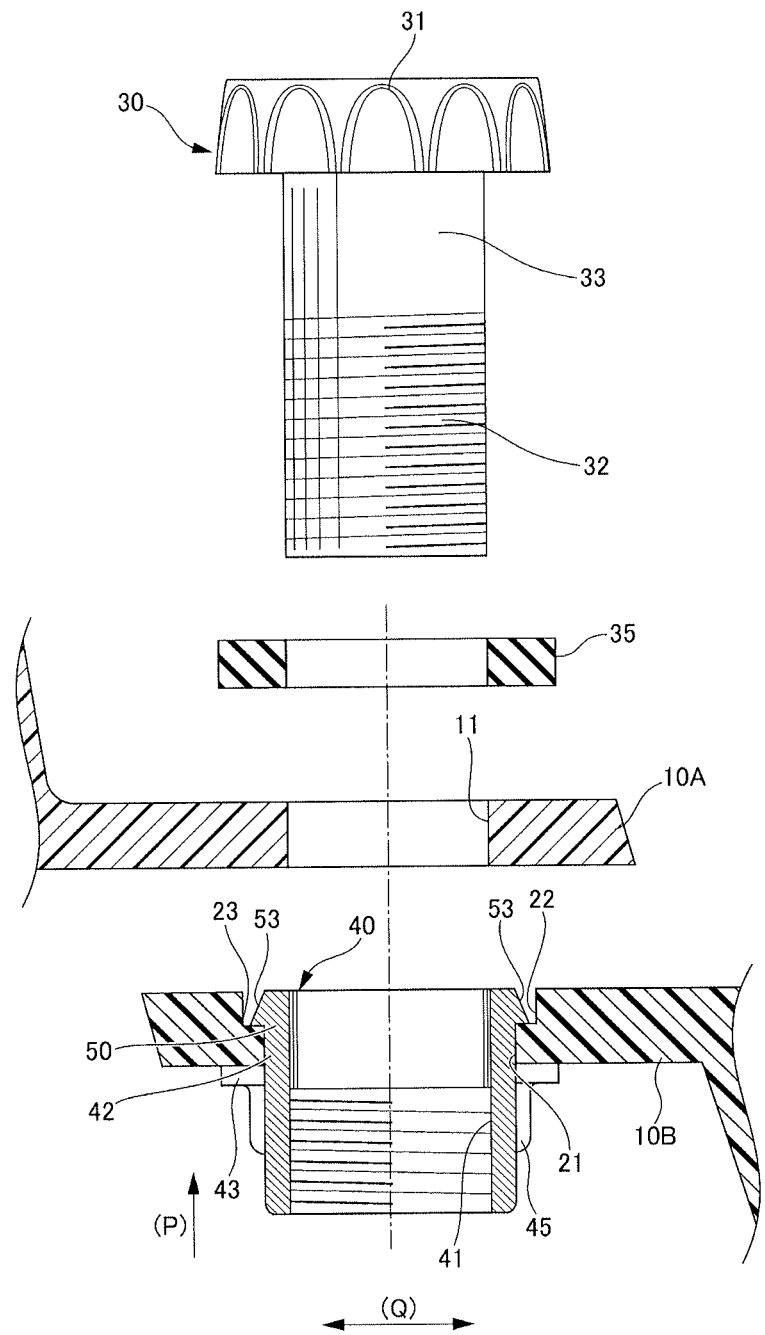
FIG. 5 is an exploded view of the fastening structure of FIG. 4.

As shown in FIG. 5, the female screw member 40 meshes with the male screw member 30 from the solar panel float 10B side, and fastens the solar panel floats 10A and 10B by securing the solar panel float 10B to the solar panel float 10A. The female screw member 40 is mounted to the second through-hole 21 in advance before the male screw member 30 is threaded into the female screw member 40. Optionally, a bushing 35 formed of rubber material and etc. may be interposed between the solar panel float 10A and the head portion 31 of the male screw member 30.

(Configuration of the Second Through-Hole 21)

Figure 6:
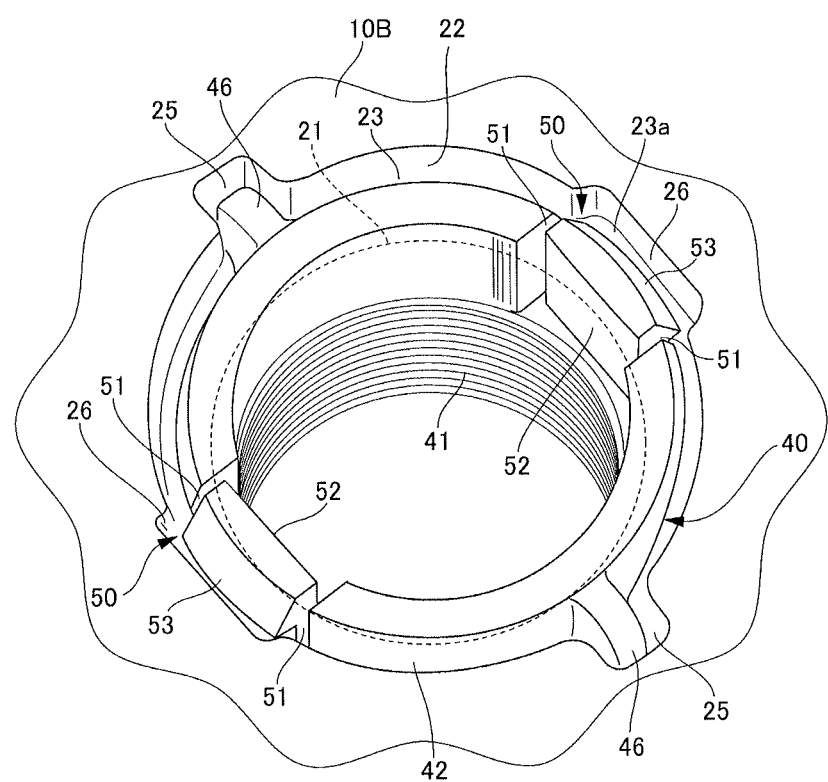
FIG. 6 is a perspective view of the fastening structure of FIG. 5 around a through-hole.

As shown in FIG. 6, a counter bore-shaped step portion 23 having an inner diameter greater than that of the second through-hole 21 is formed at the opening 22 of the second through-hole 21 at the solar panel float 10B side. Moreover, a plurality of grooves 25 is formed on the inner peripheral surface of the second through-hole 21 along the axis of the second through-hole 21. Moreover, the inner peripheral surface of the stepped portion 23 is provided with a plurality of reliefs 26 which is recessed outwardly. In this embodiment, a pair of the grooves 25 is opposed to each other, and a pair of the reliefs is opposed to each other in a direction perpendicular to the direction where the pair of grooves 25 is opposed to each other.

Figure 7A:
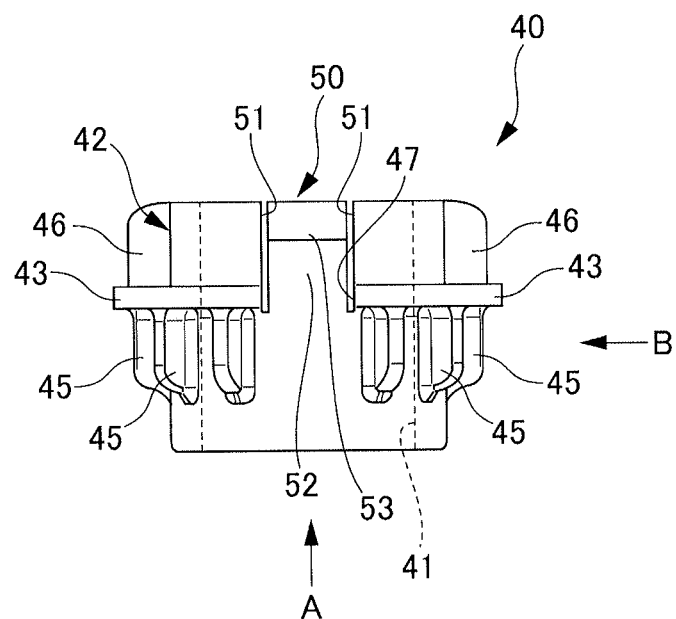
FIG. 7A is a side view of a female screw member in accordance with the first embodiment.

As shown in FIG. 7A, the female screw member 40 has a substantially cylindrical body portion 42 where the female screw 41 is formed on the inner peripheral surface thereof. At least a part of the body portion 42 is inserted into the second through-hole 21 in a direction (in this embodiment, upward direction) opposite to a direction in which the male screw member 30 is threaded (in this embodiment, downward direction) (FIG. 5). Moreover, the female screw member 40 has a pair of substantially semicircular seat surface portions 43 formed on the outer peripheral surface of the body portion 42 and a rib 45 formed below the seat surface portion 43. Moreover, a temporary fixing portion 50 is formed near the portion of the body portion 42 upper than the seat surface portion 43 (i.e., the leading end of the body portion 42 in a direction where the body portion 42 is inserted). Moreover, a projection 46 which is press-fit into the groove 25 is formed on the outer peripheral surface of the body portion 42.

While the material for the female screw member 40 may be arbitrarily selected, in this embodiment the female screw member 40 is formed by a synthetic resin molded product where the body portion 42 (including temporary fixing portions 50), the seat surface portion 43 and the rib 45 are integrally formed.

Figure 7B:
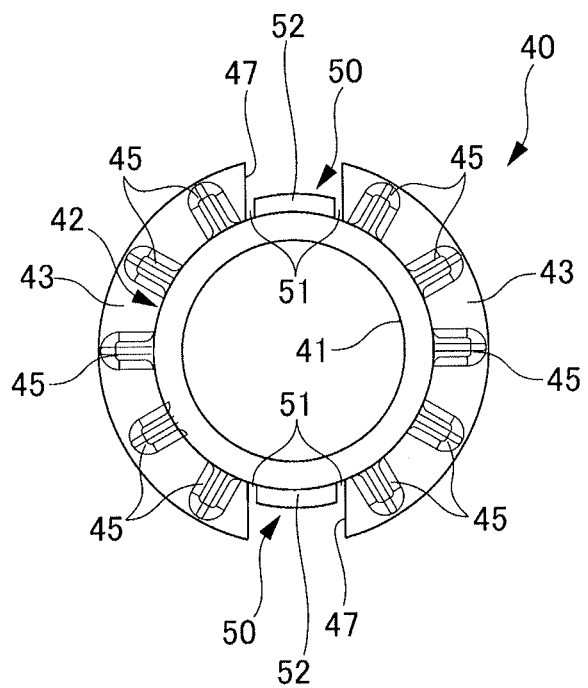
FIG. 7B is a bottom view of the female screw member of FIG. 7A, viewed in an arrow "A" direction.

As shown in FIG. 7B, the outer diameter of the pair of seat surface portions 43 is made larger than the inner diameter of the second through-hole 21 (FIG. 5). Moreover, a pair of notches 47 is formed between the pair of the seat surface portions 43. The rib 45 is formed such that it connects the outer peripheral surface of the lower portion of the body portion 42 and the lower surface of the seat surface portion 43. In this embodiment, the plurality of ribs 45 (for example, ten ribs) is arranged at the lower surface side of the pair of seat surface portions 43 at substantially regular intervals in the circumferential direction of the female screw member 40 except for the pair of notches 47.

Figure 8A:
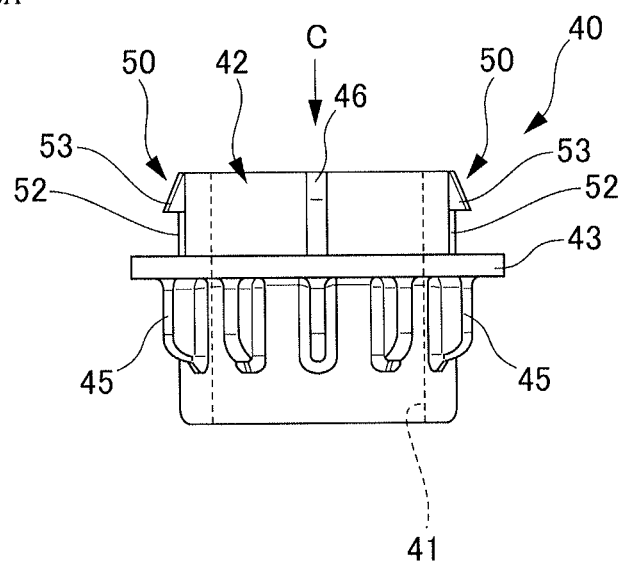
FIG. 8A is a view of FIG. 7A viewed in an arrow "B" direction.

As shown in FIG. 8A, a plurality of the temporary fixing portions 50 and a plurality of the projections 46 are respectively arranged at a substantially regular intervals in the circumferential direction of the body portion 42.

Figure 8B:
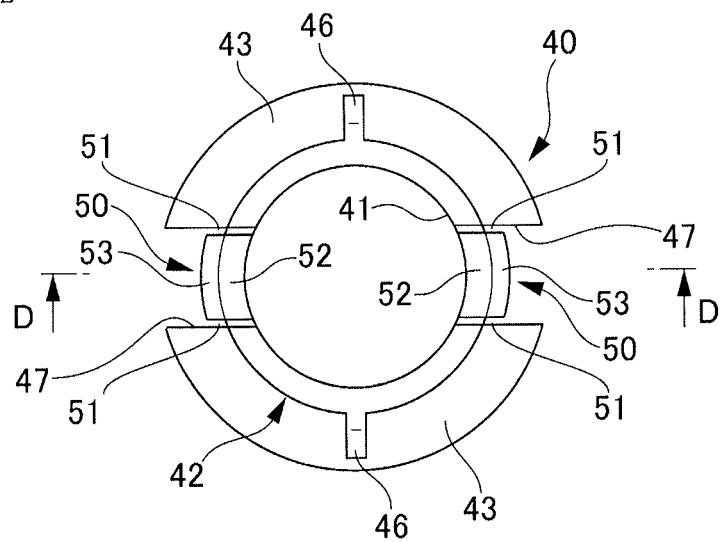
FIG. 8B is a plan view of the female screw member, viewed in an arrow "C" direction (FIG. 8A).

As shown in FIG. 8B, in this embodiment, a pair of the temporary fixing portions 50 is arranged in the upper location corresponding to the pair of notches 47, and a pair of the projections 46 is arranged such that it is opposed to each other in a direction perpendicular to the direction where the pair of temporary fixing portions 50 is opposed to each other.

The temporary fixing portion 50 prevents the body portion 42 from deviating from the second through-hole 21 (FIG. 5) during the fastening process. In more detail, the temporary fixing portion 50 can temporarily fix the female screw member 40 to the solar panel float 10B such that an operator may perform screwing (i.e., fastening) operation without holding the female screw member 40 by hand. Moreover, the temporary fixing portion 50 can also prevent the female screw member 40 from deviating from the second through-hole 21 during screwing (i.e., fastening). The temporary fixing portion 50 is formed in a direction where the body portion 42 is inserted, as indicated by an arrow "P" in FIG. 8C. The afore-mentioned direction may be hereinafter referred to as "insertion direction (P)". The temporary fixing portion 50 has two slits 51 which are opened at an upper end of the body portion 42. A deformable portion 52 is formed between the two slits 51 and inwardly elastically deformable in a direction as indicated by an arrow "Q", perpendicular to the insertion direction (P). The afore-mentioned direction may be hereinafter referred to as "perpendicular direction (Q)". Moreover, the temporary fixing portion 50 has a claw-shaped locking portion 53 which projects outwardly from the outer surface of the deformable portion 52 in the perpendicular direction (Q). The side surface of the locking portion 53 is inclined such that it gradually approaches the central axis of the body portion 42 as it proceeds upward.

Figure 8C:
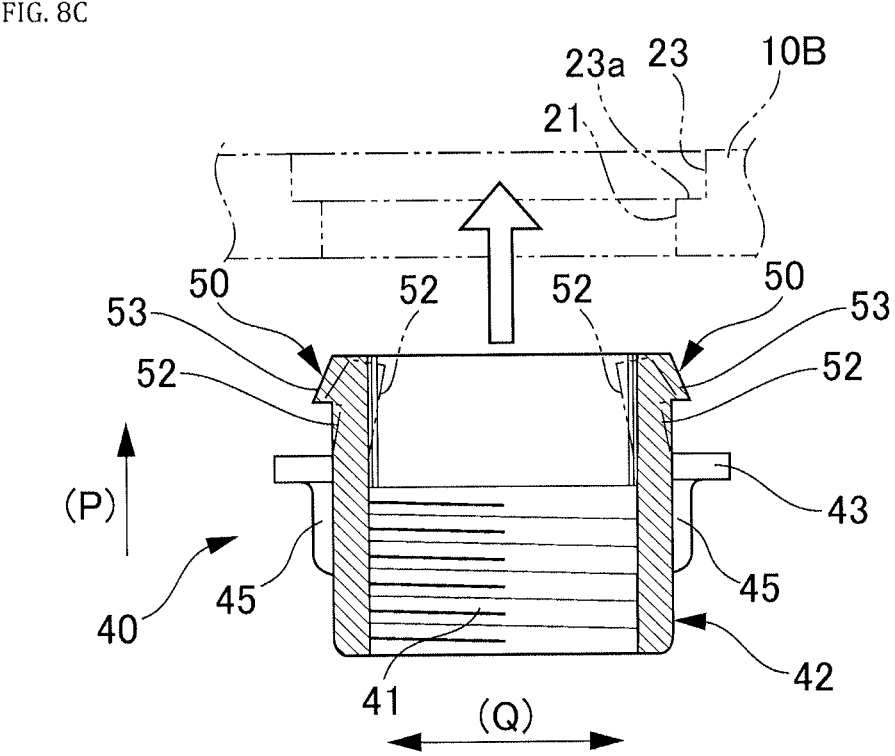
FIG. 8C is a cross-sectional view of FIG. 8B along the line D-D.

Referring to FIG. 8C shown in connection with the female screw member 40, when the side surface of the locking portion 53 is pressed against the lower end and the inner peripheral surface of the second through-hole 21, the deformable portion 52 elastically deforms inward in the perpendicular direction (Q) of the body portion 42, as shown in two-dot chain line. As a result, at least a part of the body portion 42 is gradually inserted from the back side of the solar panel float 10B into the second through-hole 21 with the locking portion 53 inwardly retreating. Then, once the lower end of the locking portion 53 passes the lower end of the step portion 23, the deformable portion 52 outwardly restores in the perpendicular direction (Q) and the locking portion 53 catches on an annular horizontal plane 23a of the step portion 23. At this time, the locking portion 53 moves to the relief portion 26 (FIG. 6), thereby preventing the interference between the inner peripheral surface of the step portion 23 and the locking portion 53. Due to such a locking portion 53, the female screw member 40 is prevented from downward movement and is mounted to the solar panel float 10B with upward movement thereof inhibited by the seat surface portion 43. In this embodiment, the height of the step portion 23 is set such that the tip (i.e., the leading end) of the body portion 42 of the female screw member 40 does not project from the peripheral edge of the second through-hole 21 (i.e., the peripheral edge of the upper end of the opening 22) formed in the solar panel float 10B. As a result, the tip (i.e., the leading end) of the body portion 42 is made flush with the peripheral edge of the second through-hole 21. Due to such a step portion 23, the solar panel float 10A and the solar panel float 10A are closely fixed to each other.

(Fastening Method Using the Female Screw Member 40)

Next, it will be described fastening method using the female screw member 40 with reference to FIG. 5. As shown in FIG. 5, in this fastening method, the operator firstly superimposes the first through-hole 11 of the solar panel float 10A on the upper end of the second through-hole 21 of the solar panel float B to which the female screw member 40 is mounted in advance.

Moreover, the operator downwardly inserts the male screw member 30 from above through the bushing 35 into the first through-hole 11. Then, the operator rotates the head portion 31 of the male screw member 30, for example, by using a tool, to thread the male screw 31 into the female screw 41. At this time, while the rotation of the female screw member 40 is inhibited by the press-fit engagement of the projection 46 into the groove 25 (FIG. 6), the male screw member 30 is threaded into the female screw member 40. Due to the fastening force between the male screw member 30 and the female screw member 40, the solar panel float 10A is fastened to the head portion 31 of the male screw member 30 and the solar panel float 10B is fastened to the seat surface portion 43 of the female screw member 40. As such, the two solar panel floats 10A, 10B are fastened to each other.

Technical Effect of the First Embodiment

The technical effect attained by the afore-mentioned first embodiment is hereinafter described. In accordance with the first embodiment, when the two solar panels floats 10A, 10B are fastened by the male screw member 30, the male screw member 30 can be threaded into the female screw member 40 which has been temporarily fixed to the solar panel float 10B. Therefore, when threading the male screw member 30 into the female screw member 40 during the fastening operation of the two solar panel floats 10A, 10B, the operator needs not hold the female screw member 40 on the back side of the solar panel float 10B. For the above reason, the operation of fastening by screws can be easily performed.

Moreover, due to a simple configuration of the deformable portion 52 and the locking portion 53 formed in the deformable portion 52, the female screw member 40 provided with the temporary fixing portion 50 can be obtained.

Moreover, when the operator threads the male screw member 30 into the female screw member 40, due to press-fit engagement of the projection 46 into the groove 25 the rotation of the female screw member 40 (so called co-rotation) is prevented. For the above reason, the operator can more easily perform the fastening operation.

First Modification of the First Embodiment

Next, the first modification of the first embodiment will be hereinafter described with reference to FIG. 9. Moreover, the same reference sign will be assigned to the same element or part as the afore-mentioned fastening structure (FIG. 5), and overlapping description will be omitted.

While in the afore-mentioned fastening structure (FIG. 5) the female screw 41 is integrally formed with the inner peripheral surface of the body portion 42 (FIG. 8C), the portion including the female screw 41 may be formed as a separate part.

Figure 9A:
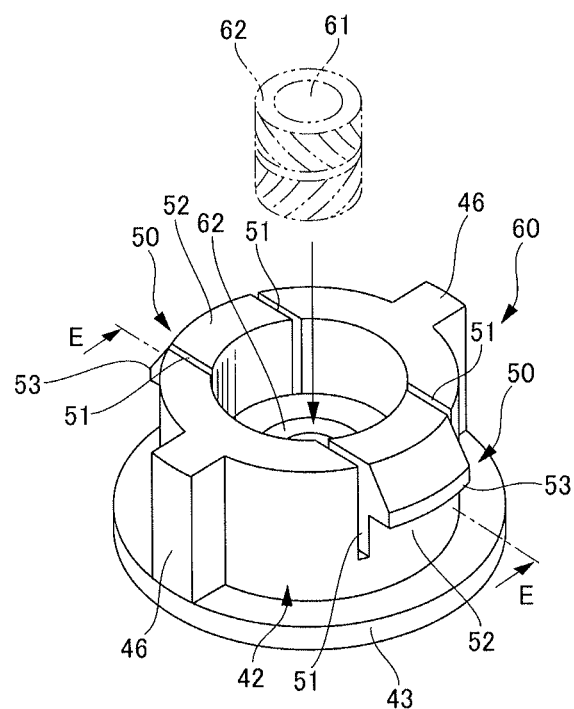
FIG. 9A is a perspective view of the female screw member illustrating the female screw member in accordance with a first modification of the first embodiment.
Figure 9B:
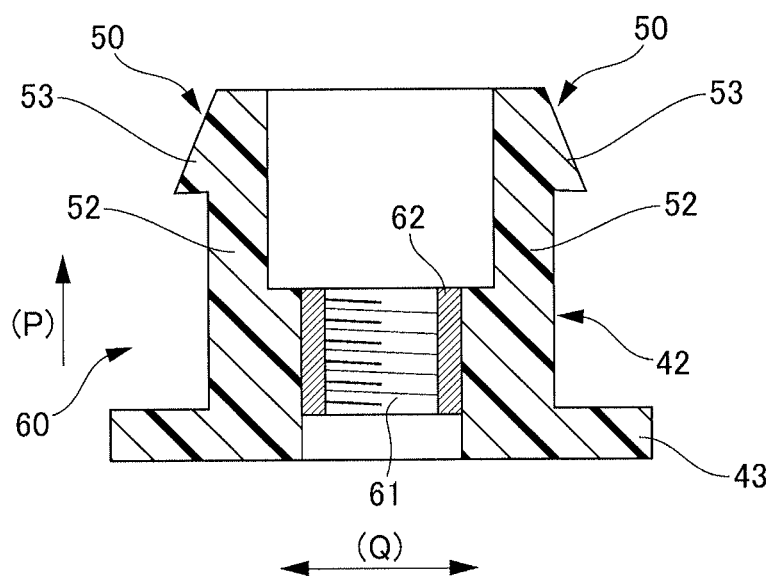
FIG. 9B is a cross-sectional view of FIG. 9A along the line E-E.

For example, as shown in FIGS. 9A and 9B, a female screw member 60 in accordance with a first modification of the first embodiment has a cylindrical portion which has a female screw 61 and is formed by metallic insert part 62. Moreover, a majority of the remaining female screw member 60 is formed by synthetic resin molding. Such a female screw member 60 can be obtained by resin molding (e.g., injection molding) with the insert part 62 inserted into a molding die. The above resin molding can be called as "insert molding". Moreover, the female screw member 60 employs a simple structure in which the cylindrical portion is not formed below the seat surface portion 43.

In accordance with the first modification of the first embodiment, substantially same effects as the above-described fastening structure (FIG. 5) can be obtained. Moreover, since the female screw 61 is formed of metal, the female screw member 60 which is excellent in both of strength and durability can be obtained.

In the first modification of the first embodiment, the process for producing the female screw member 60 is not limited to the afore-mentioned injection molding with the insert part 62 inserted into the molding die. For example, a portion corresponding to the seat surface portion 43 may be subjected to injection molding, and the insert part 62 may be subsequently press-fitted.

Second Modification of the First Embodiment

Next, a second modification of the first embodiment in accordance with the invention will be described with reference to FIG. 10. While in the afore-mentioned fastening structure (FIG. 5) the rotation prevention mechanism based on the groove 25 and the projection 46 (FIG. 6) is imparted to the body portion 42, the outer shape of the body portion may be non-circular thereby imparting the rotation prevention mechanism to the body portion.

Figure 10:
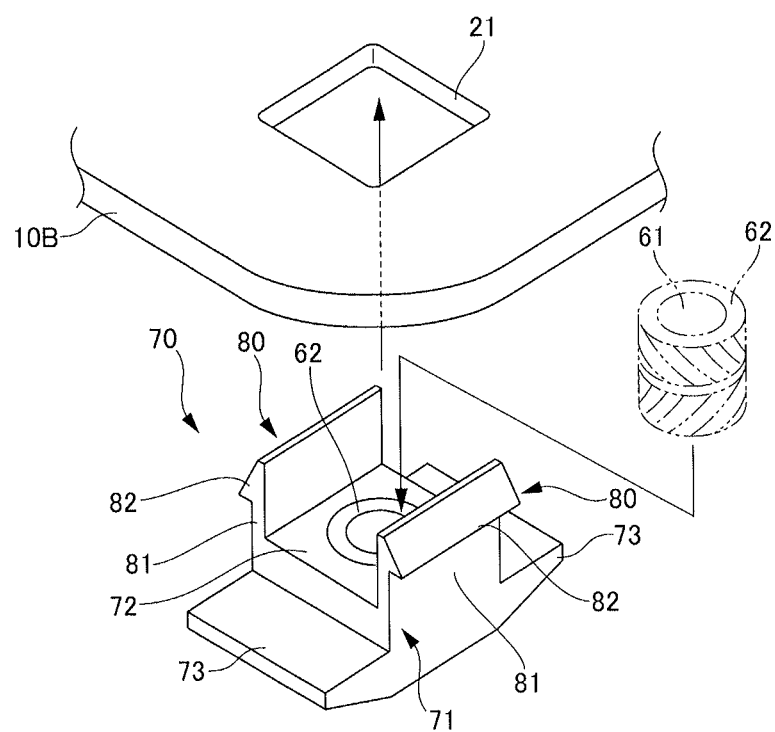
FIG. 10 is an exploded perspective view of a through-hole and a female screw member in accordance with a second modification of the first embodiment.

For example, as shown in FIG. 10, a female screw member 70 in accordance with the second modification of the first embodiment has a body portion 71 with a non-circular outer shape (in this embodiment, a tetragonal shape in a plan view) corresponding to the non-circular second through-hole 21 (in this embodiment, a tetragonal shape in a plan view). The body portion 71 has a substantially tetragonal bottom portion 72, and a temporary fixing portion 80 formed integrally with the bottom portion 72. The temporary fixing portion 80 has a pair of plate-like deformable portions 81 rising from a pair of opposed sides of the bottom portion 72, and a locking portion 82 formed in the tip portion (i.e., leading end) of the deformable portion 81. Moreover, a pair of plate-like seat surface portions 73 is formed in other pair of opposed sides of the bottom portion 72.

In accordance with the second modification of the first embodiment, substantially same effects as the above-described fastening structure (FIG. 5) can be obtained. Moreover, the body portion 71 has non-circular shape corresponding to the shape of the second through-hole 21 to prevent the rotation of the body portion 71. As a result, the configuration of the female screw member 70 can be further simplified.

Third Modification of the First Embodiment

Next, a third modification of the first embodiment in accordance with the invention will be hereinafter described with reference to FIGS. 11A and 11B. While in the afore-mentioned fastening structure (FIG. 5), the female screw member 40 is formed by the synthetic resin part, it may be formed by metallic press molding.

Figure 11A:
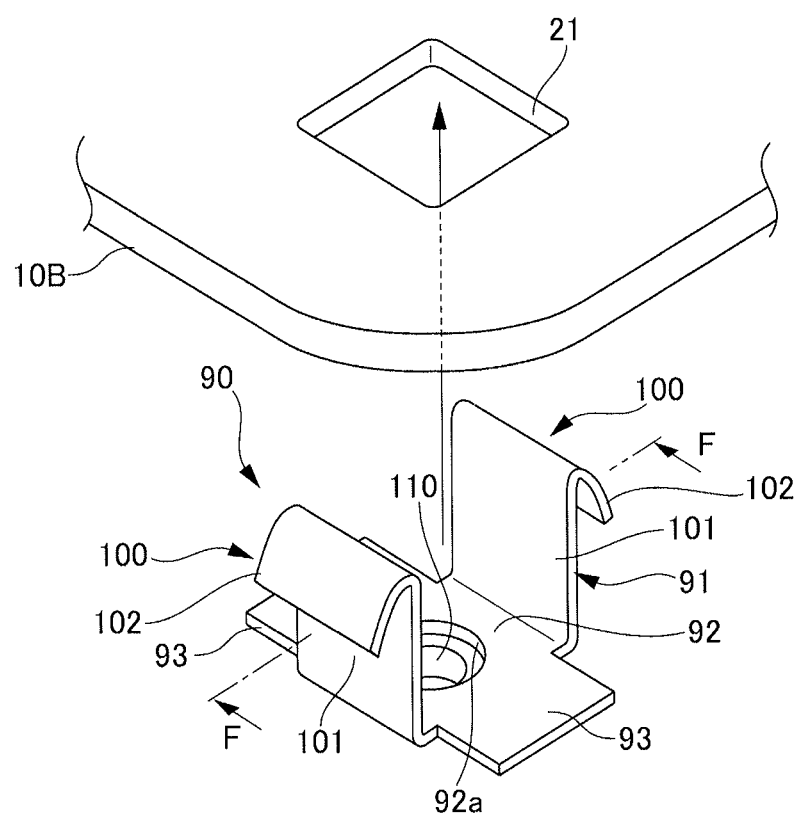
FIG. 11A is an exploded perspective view of a through-hole and a female screw member illustrating the fastening structure in accordance with a third modification of the first embodiment.

For example, as shown in FIG. 11A, the female screw member 90 in accordance with the third modification of the first embodiment is mainly formed of press-processed product where a metallic plate is bent into substantially U shape to form a body portion 91. The body portion 91 has a substantially tetragonal bottom portion 92 and a temporary fixing portion 100 formed integrally with the bottom portion 92. The temporary fixing portion 100 has a pair of plate-like deformable portions 101 rising from a pair of opposed sides of the bottom portion 92, and a locking portion 102 which is formed by outwardly folding the tip portion (i.e., leading end) of the deformable portion 101. Moreover, a pair of plate-like seat surface portions 93 is formed in other pair of opposed sides of the bottom portion 92.

Figure 11B:
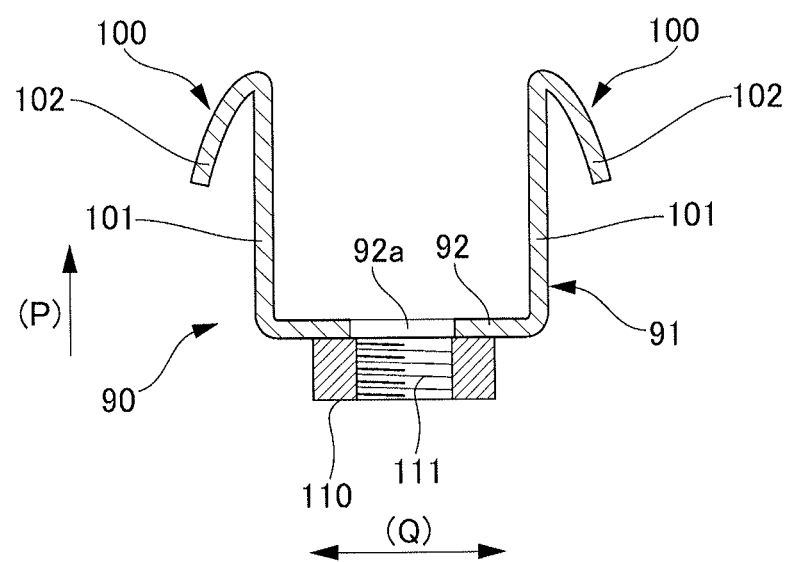
FIG. 11B is a cross-sectional view of FIG. 11A along the line F-F.

Moreover, as shown in FIG. 11B, a through-hole 92a is formed in the bottom portion 92 of the female screw member 90, and a cylindrical part 110 with a female screw 111 matching the through-hole 92a is joined to the lower surface of the bottom portion 92 by welding or the like.

In accordance with the third modified embodiment, substantially same effects as the above-described fastening structure (FIG. 5) can be obtained. Moreover, the female screw member 90 mainly formed of metallic plate can be obtained. Moreover, as the cylindrical part 110 with the female screw 111 is separately joined, the length of the female screw 111 can be arbitrarily set independent of the thickness of the metallic plate. For example, even in a case where the metallic plate is thin, the length of the female screw 111 required in terms of fastening strength can be secured.

Fastening Structure in Accordance with the Second Embodiment

Figure 12A:
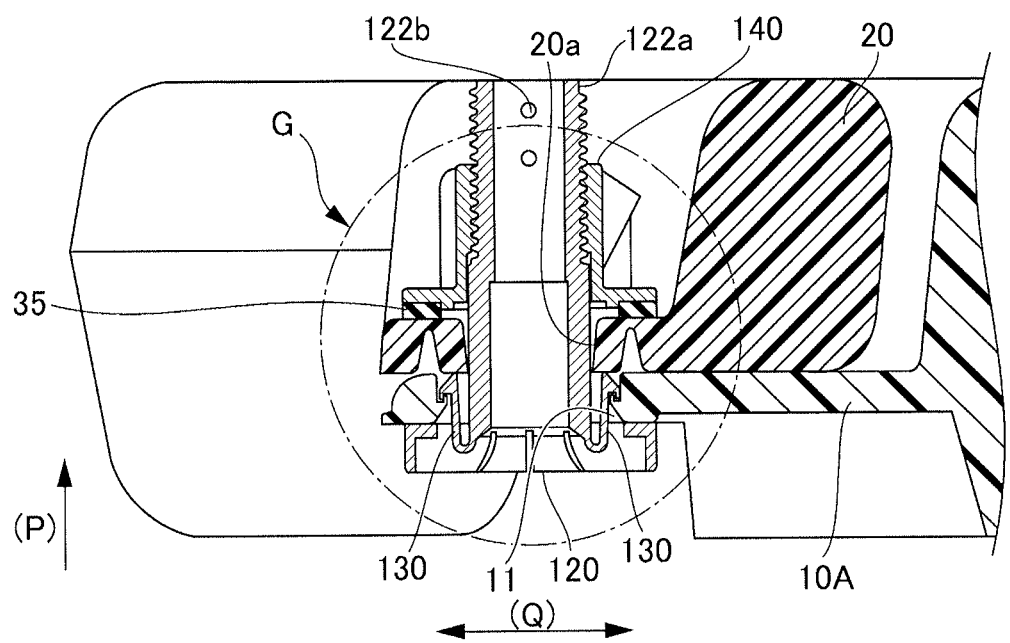
FIG. 12A is a cross-sectional view of the fastening structure in accordance of a second embodiment.
Figure 12B:
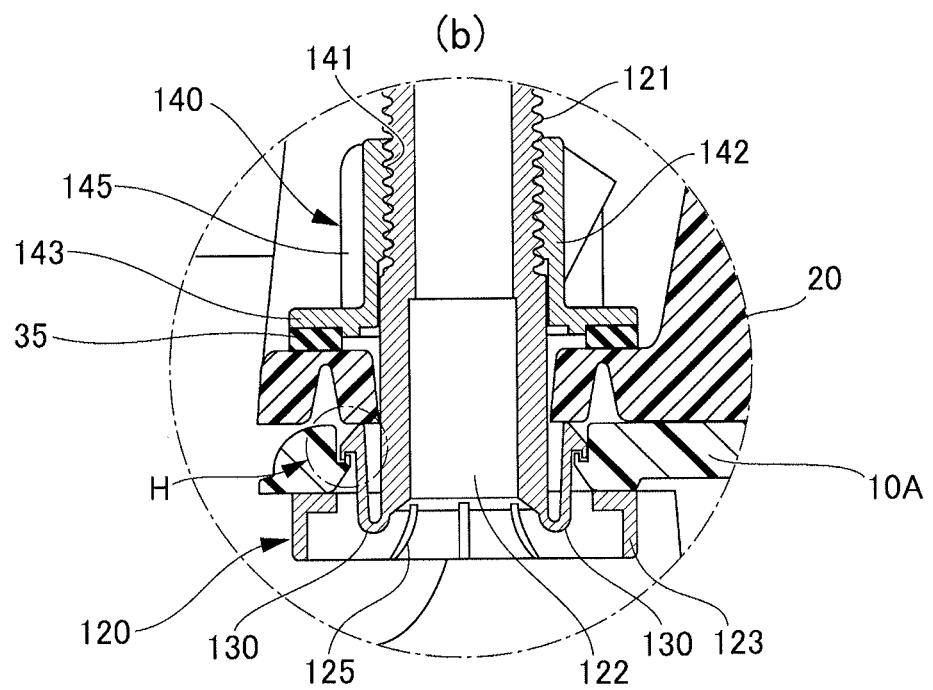
FIG. 12B is an enlarged view of section G of FIG. 12A.
Figure 12C:
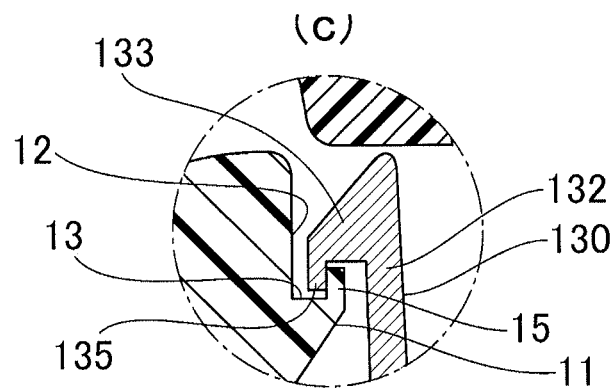
FIG. 12C is an enlarged view of section H of FIG. 12B.

Next, a fastening structure in accordance with second embodiment will be hereinafter described with reference to FIGS. 12-21. As shown in FIGS. 12A and 12B, the fastening structure in accordance with the second embodiment is a connection structure for the solar panel float, and fastens the portion where the connection member 20 and the solar panel float 10A overlap. In this regard, the connection member 20 and the solar panel float 10A may constitute a plurality of objects to be fastened in accordance with the invention, and respectively correspond to the first object to be fastened and the second object to be fastened. The fastening structure has a third through-hole 20a provided in the connection member 20, the first though-hole 11 provided in the solar panel float 10A to match the third through-hole 20a, a female screw member 140, a male screw member 120, a bushing 35 which is provided between the connection member 20 and the female screw member 140 and formed of rubber material. In this regard, the male screw member 120 and the female screw member 140 correspond to "a pair of screw members" in accordance with the embodiment As shown in FIG. 12C, a counter bore-shaped step portion 13 having an inner diameter greater than that of the second through-hole 11 is formed at the opening 12 of the first through-hole 11 at the connection member 20 side. Moreover, an annular protrusion 15 is formed in the inner edge portion of the step portion 13.

Figure 13:
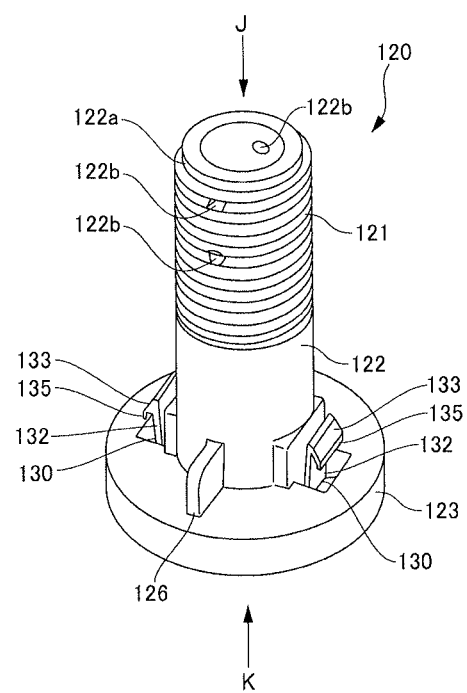
FIG. 13 is a perspective view of the male screw member of FIG. 12A.

As shown in FIG. 13, the male screw member 120 has a substantially cylindrical body portion 122 where a male screw 121 is formed on the outer peripheral surface thereof. At least a part of the body portion 122 is upwardly inserted from below into the first through-hole 11 (FIG. 12A). Moreover, the male screw member 120 has a disk-shaped head portion 123 formed in the lower end of the body portion 122 and the projection 126 formed on the upper surface of the head portion 123. Moreover, a temporary fixing portion 130 is formed near the lower end portion of the body portion 122 (i.e., an end portion opposite to a leading end in the insertion direction). Moreover, the body portion 122 has a guide portion 122a as a smooth cylindrical surface, and a locking hole 122b perpendicularly passing through the body portion 122 with respect to an axial direction of the body portion 122.

Figure 14A:
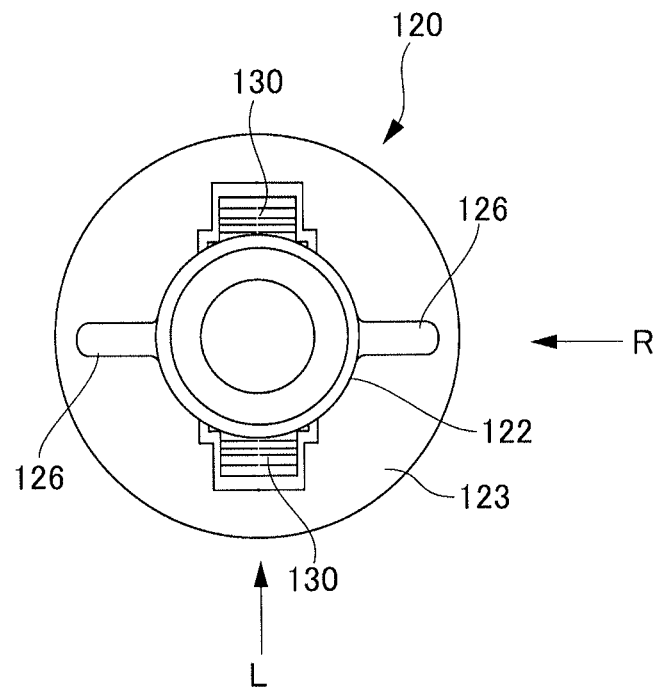
FIG. 14A is a view of FIG. 13 viewed in an arrow "J" direction.
Figure 14B:
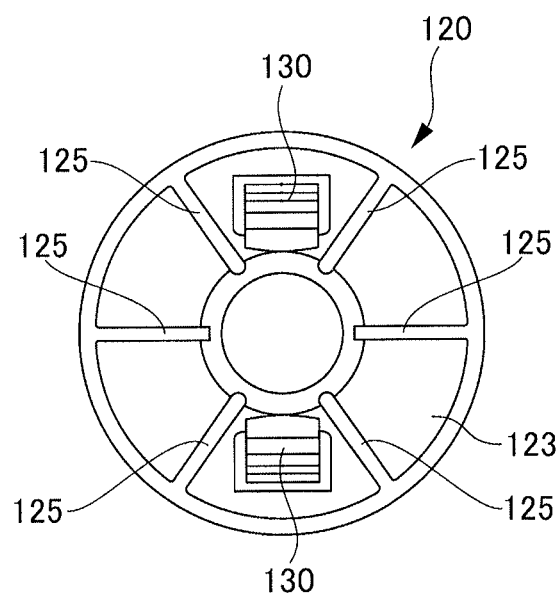
FIG. 14B is a view of FIG. 13 viewed in an arrow "K" direction.

As shown in FIG. 14A, in this embodiment, a pair of temporary fixing portions 130 is opposed to the body portion 122, and a pair of projections 126 is opposed to each other in a direction perpendicular to the direction where the pair of temporary fixing portions 130 is opposed to each other. The projection 126 can engage the groove portion (not shown) formed in the solar panel float 10A. Moreover, as shown in FIG. 14B, the head portion 123 has a plurality of ribs 125 which is formed from the outer periphery of the head portion 123 toward the center of the head portion 123 in a radial direction.

Figure 15A:
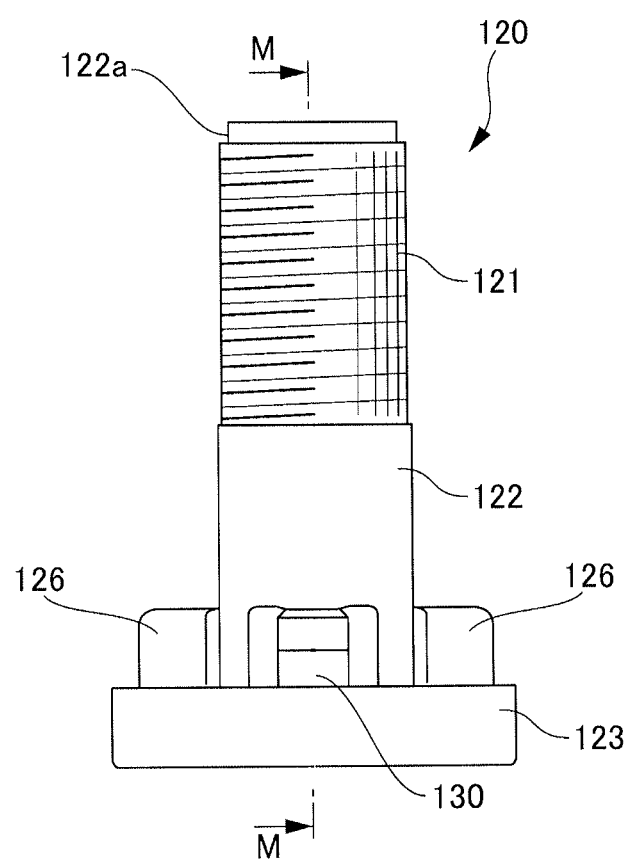
FIG. 15A is a view of FIG. 14A viewed in an arrow "L" direction.
Figure 15B:
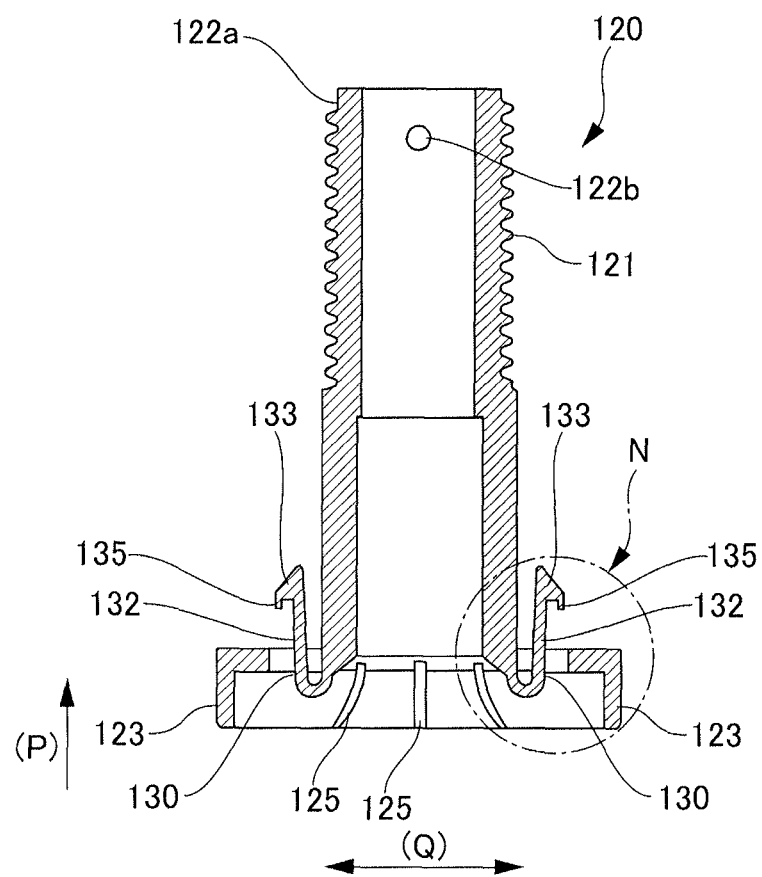
FIG. 15B is a cross-sectional view of FIG. 15A along the line M-M.

As shown in FIGS. 15A and 15B, the temporary fixing portion 130 prevents the body portion 122 from deviating from the first through-hole 11 (FIG. 12A). In more detail, the temporary fixing portion 130 can temporarily fix the male screw member 120 to the solar panel float 10A such that an operator can perform screwing (i.e., fastening) operation without holding the male screw member 120 by hand. Moreover, the temporary fixing portion 130 can also prevent the male screw member 120 from deviating from the first through-hole 11 during screwing (i.e., fastening) operation. The temporary fixing portion 130 has a deformable portion 132 which is elastically inwardly deformable in the perpendicular direction (Q) perpendicular to the insertion direction (P). Moreover, the temporary fixing portion 130 has a claw-shaped locking portion 133 which projects outwardly from the outer surface of the deformable portion 132 in the perpendicular direction (Q). The side surface of the locking portion 133 is inclined such that it gradually approaches the central axis of the body portion 122 as it proceeds upward.

Figure 16:
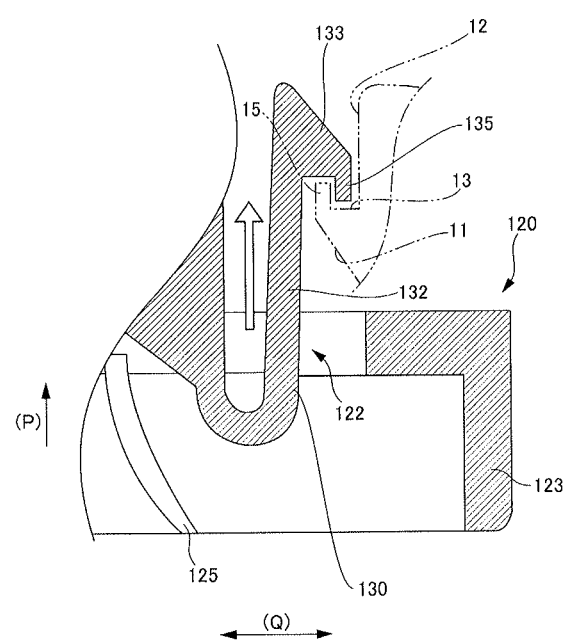
FIG. 16 is an enlarged view of section N of FIG. 15B.

As shown in FIG. 16, the locking portion 133 has an annular barb portion 135 which is formed corresponding to the projection 15 of the opening 12 of the first through-hole 11. In connection with the male screw member 120, when the side surface of the locking portion 133 is pressed against the inner peripheral surface of the first through-hole 11, the deformable portion 132 elastically inwardly deforms in the perpendicular direction (Q). As a result, at least a part of the body portion 122 is gradually inserted into the first through-hole 11 with the locking portion 133 inwardly retreating in the perpendicular direction (Q). Once the lower end of the locking portion 133 passes the step portion 13, the deformable portion 132 outwardly restores in the perpendicular direction (Q) and the locking portion 133 catches on the step portion 13. Moreover, the barb portion 135 is press-fit into and engage the projection 15 from above. Due to such a locking portion 133, the male screw member 120 is prevented from downward movement and is mounted to the solar panel float 10A with upward movement thereof inhibited by the head portion 123.

Figure 17A:
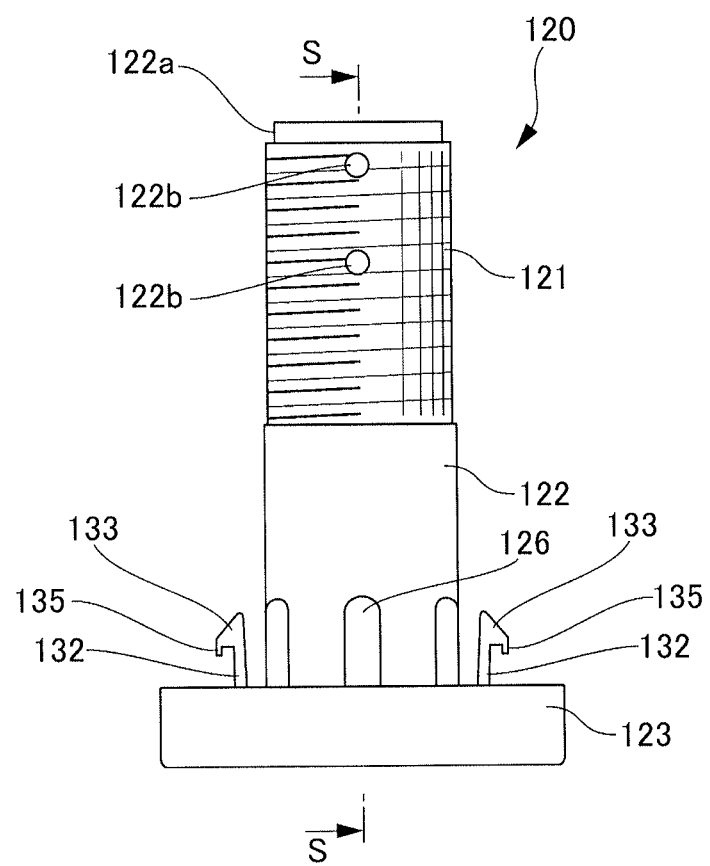
FIG. 17A is a view of FIG. 14A viewed in an arrow "R" direction.
Figure 17B:
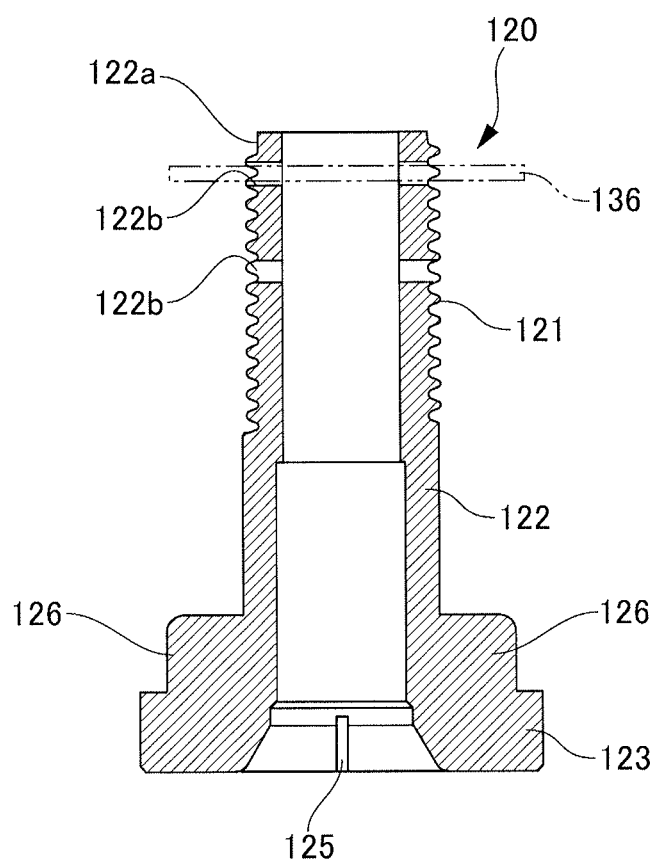
FIG. 17B is a cross-sectional view of FIG. 15A along the line S-S.

As shown in FIGS. 17A and 17B, the guide portion 122a functions to smoothly guide the male screw member 120 to the female screw member 140, and is formed as a smooth cylindrical surface where no male screw is formed. Moreover, the locking hole 122b is provided for passing a wire 136 or pin thereinto. The male screw member 120 can be at least partly prevented from deviating from the first through-hole 11 by the configuration that the wire 136, pin and etc. can be passed through the locking hole 122b which is located above the male screw 121. A plurality of the locking holes 122b is arranged in an axial direction of the body portion 122 such that it can be selected depending on the location of threadable engagement of the female screw member 140.

Figure 18:
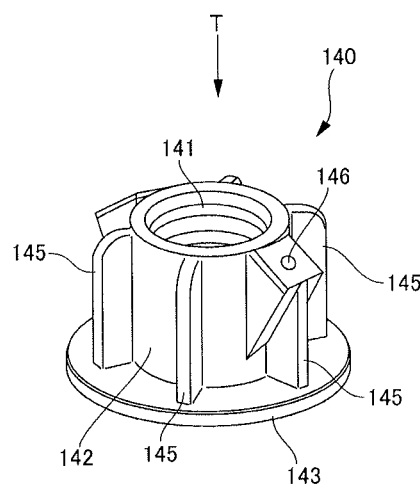
FIG. 18 is a perspective view of the female screw member of FIG. 12A.

As shown in FIG. 18, the female screw member 140 has a substantially cylindrical body portion 142 where the female screw 141 is formed on the inner peripheral surface. Moreover, the male screw member 140 has a disk-shaped seat surface portion 143 formed on the outer peripheral surface of the body portion 142 and a rib 145 formed on the upper side of the seat surface portion 143. An oblique hole 146 is formed in the upper portion of the rib 145.

Figure 19:
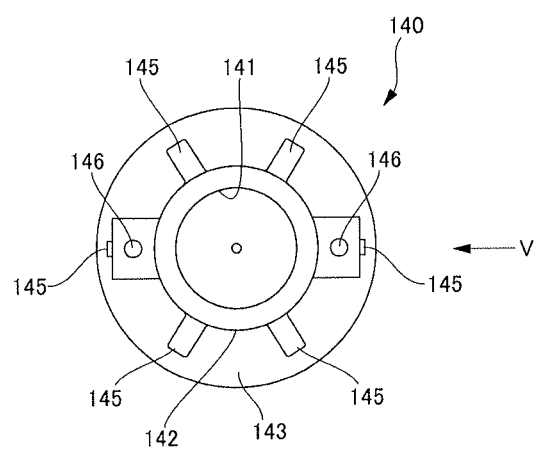
FIG. 19 is a view of FIG. 18 viewed in an arrow "T" direction.
Figure 20:
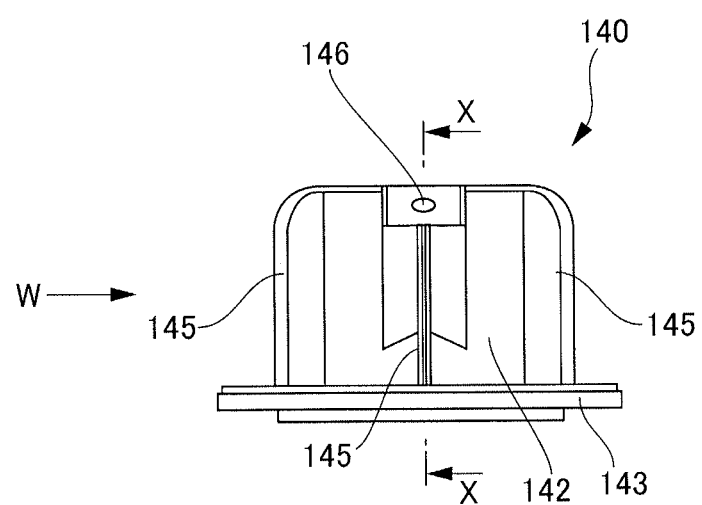
FIG. 20 is a view of FIG. 19 viewed in an arrow "V" direction.

As shown in FIGS. 19 and 20, a plurality of the ribs 145 (in this embodiment, six ribs) is radially arranged in a circumferential direction of the seat surface portion 143. The operator threadably couples the female screw member 140 to the male screw member 120, for example, by rotating the plurality of ribs 145 by hand or tool.

Figure 21A:
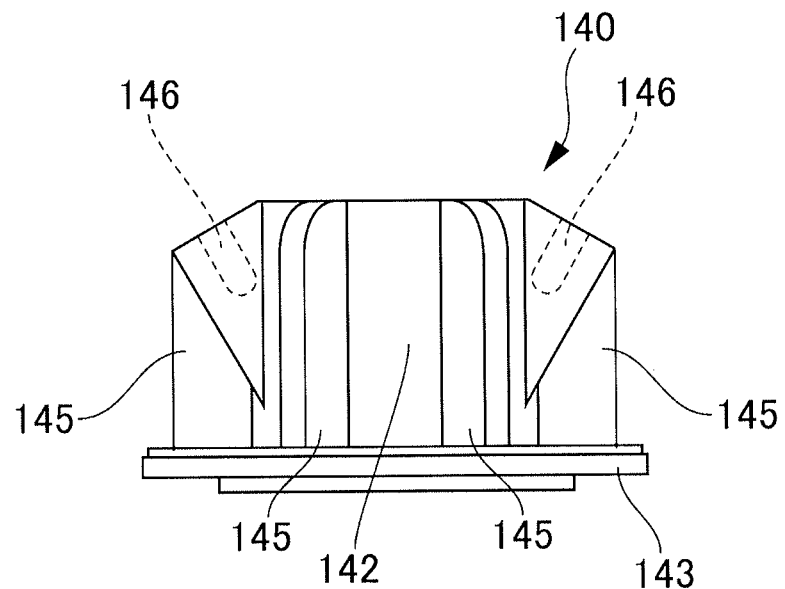
FIG. 21A is a view of FIG. 20 viewed in an arrow "W" direction.
Figure 21B:
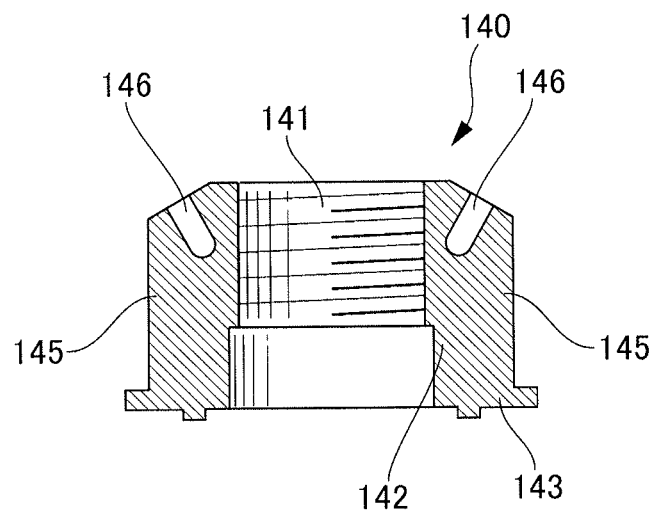
FIG. 21B is a cross-sectional view of FIG. 20 along the line X-X.

As shown in FIGS. 21A and 21B, the oblique hole 146 is provided on each of the pair of opposed ribs 145, and downwardly inclined from the upper surface of the rib 145 toward the central axis of the female screw member 140. The female screw member 140 can be fastened with respect to the male screw member 120 by the insertion of a fastening pin (not shown) into the oblique hole 146. Therefore, the connection member 20 and the solar panel float 10A can be firmly fastened by the male screw member 120 and the female screw member 140.

(Fastening Method Using the Male Screw Member 120)

Next, it will be described fastening method using the male screw member 120. In this fastening method, the operator firstly superimposes the third through-hole 20a of the connection member 20 on the upper end of the first through-hole 11 of the solar panel float 10A to which the male screw member 40 has been mounted in advance.

Furthermore, the operator threadably fastens the female screw member 140 to the male screw member 120 by the press-fit engagement through the bushing 35 using the guide portion 122a and the rotation of the female screw member 140, for example, by a tool. As a result, the female screw 141 threadably engages the male screw 121. Due to the fastening force between the male screw member 120 and the female screw member 140, the solar panel float 10A is fastened to the head portion 123 of the male screw member 120 and the connection member 20 is fastened to the seat surface portion 143 of the female screw member 140. As such, the solar panel floats 10A and the connection member 20 are fastened to each other.

Technical Effect of the Second Embodiment

The technical effect attained by the afore-mentioned second embodiment is hereinafter described. In accordance with the second embodiment, when the connection member 20 and the solar panels float 10A are fastened, the female screw member 140 threadably engages the male screw member 120 which has been temporarily fixed to the solar panel float 10A. Therefore, when threadably engaging the female screw member 140 during fastening the connection member 20 and the solar panel float 10A, the operator needs not hold the female screw member 140 on the back side of the solar panel float 10A. For the above reason, the operation of fastening by screws can be easily performed.

Moreover, due to a simple configuration of the deformable portion 132 and the locking portion 133 formed in the deformable portion 132, the male screw member 120 provided with the temporary fixing portion 130 can be obtained.

Moreover, since the barb portion 135 of the male screw member 120 is locked in the projection 15 of the first through-hole 11, the operator can securely lock the male screw member 120 in the first through-hole 11.

Moreover, since the body portion 122 of the male screw member 120 has the guide portion 122a as the smooth cylindrical surface, the operator can smoothly guide and insert the male screw member 120 into the female screw member 140. Therefore, the threadable engagement between the female screw member 140 and the male screw member 120 can be further facilitated.

Modifications of First Embodiment

Figure 22:
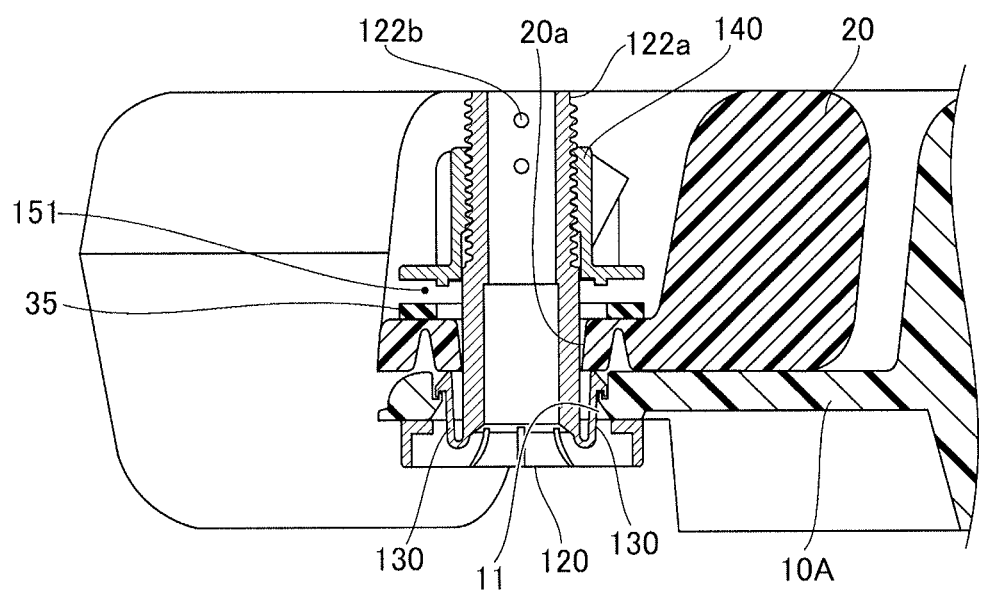
FIG. 22 is a cross-sectional view of a fastening structure in accordance with a first modification of the second embodiment.

Next, the first to fifth modifications of the second embodiment will be hereinafter described with reference to FIGS. 22-26. As shown in FIG. 22, a fastening structure in accordance with the first modification of the second embodiment is basically similar to the fastening structure as shown in FIG. 12A except that a gap 151 is created between the bushing 35 and the female screw member 140.

Figure 23:
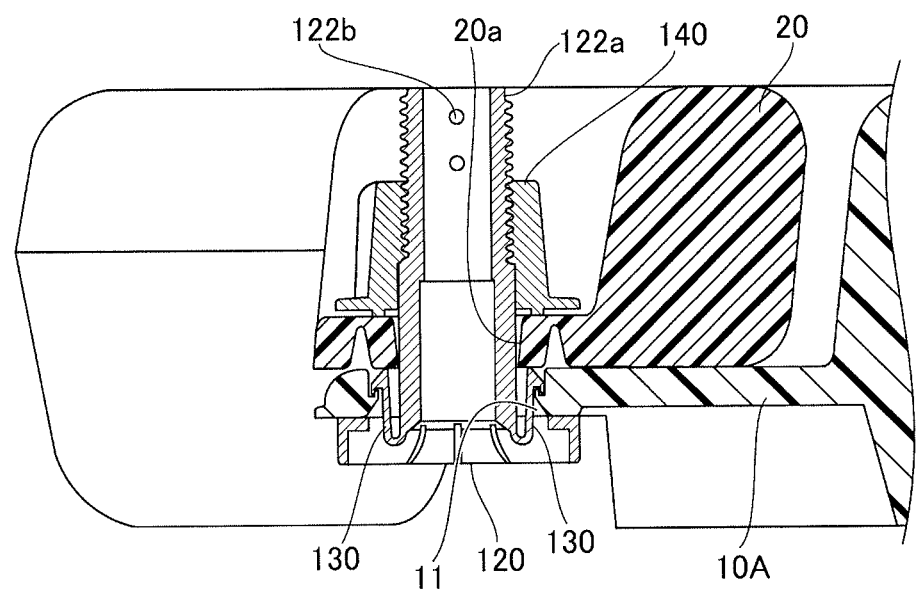
FIG. 23 is a cross-sectional view of a fastening structure in accordance with a second modification of the second embodiment.

As shown in FIG. 23, the fastening structure in accordance with the second modification of the second embodiment is basically similar to the fastening structure as shown in FIG. 12A except that the bushing 35 is omitted, and the seat surface portion 143 of the female screw member 140 is in direct contact with the connection member 20.

Figure 24:
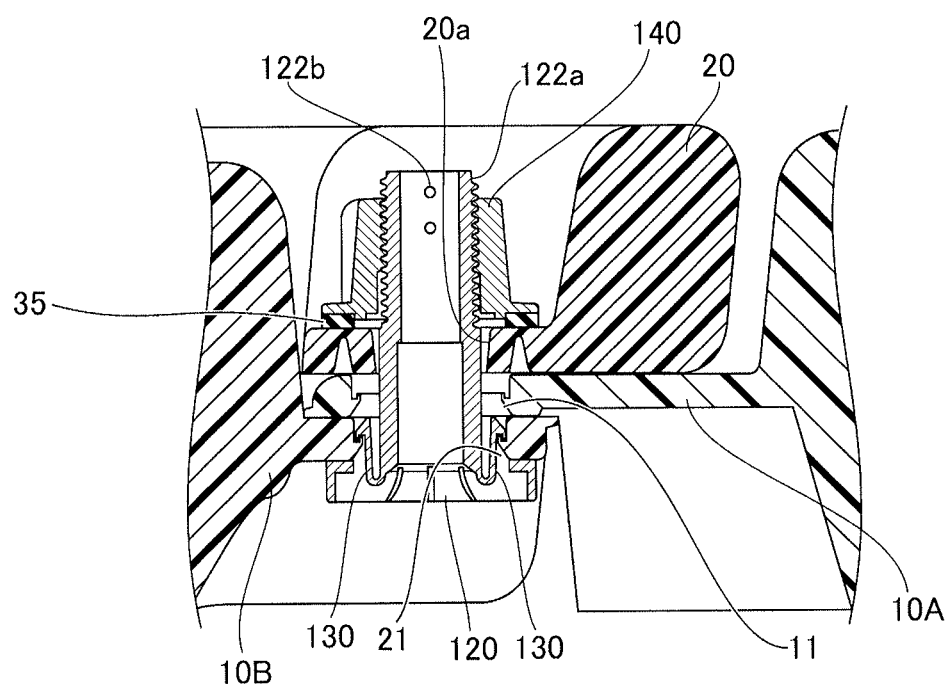
FIG. 24 is a cross-sectional view of a fastening structure in accordance with a third modification of the second embodiment.

As shown in FIG. 24, the fastening structure in accordance with the third modification of the second embodiment is a connection structure for the solar panel float, and fastens the portion where three objects to be fastened including the connection member 20 and the two neighboring solar panel floats 10A and 10B overlap. In this regard, the connection member 20 and the solar panel floats 10A, 10B may constitute a plurality of objects to be fastened in accordance with the invention. The connection member 20 corresponds to the first object to be fastened, and the solar panel float 10B corresponds to the second object to be fastened. The fastening structure has the third through-hole 20a provided in the connection member 20, the first though-hole 11 provided in the solar panel float 10A to match the third through-hole 20a, the second through-hole 21 provided in the solar panel float 10B to match the third through-hole 20a, the male screw member 120, the female screw member 140, and the bushing 35 which is provided between the connection member 20 and the female screw member 140 and formed of rubber material.

Figure 25:
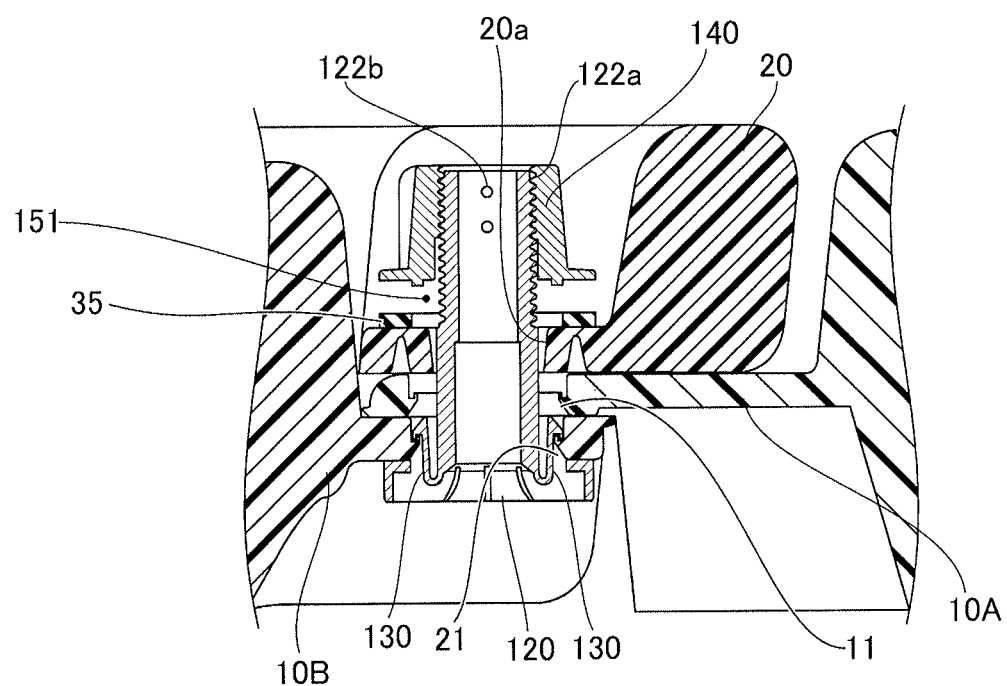
FIG. 25 is a cross-sectional view of a fastening structure in accordance with a fourth modification of the second embodiment.

As shown in FIG. 25, the fastening structure in accordance with the fourth modification of the second embodiment is basically similar to the fastening structure as shown in FIG. 24 except that the gap 151 is created between the bushing 35 and the female screw member 140.

Figure 26:
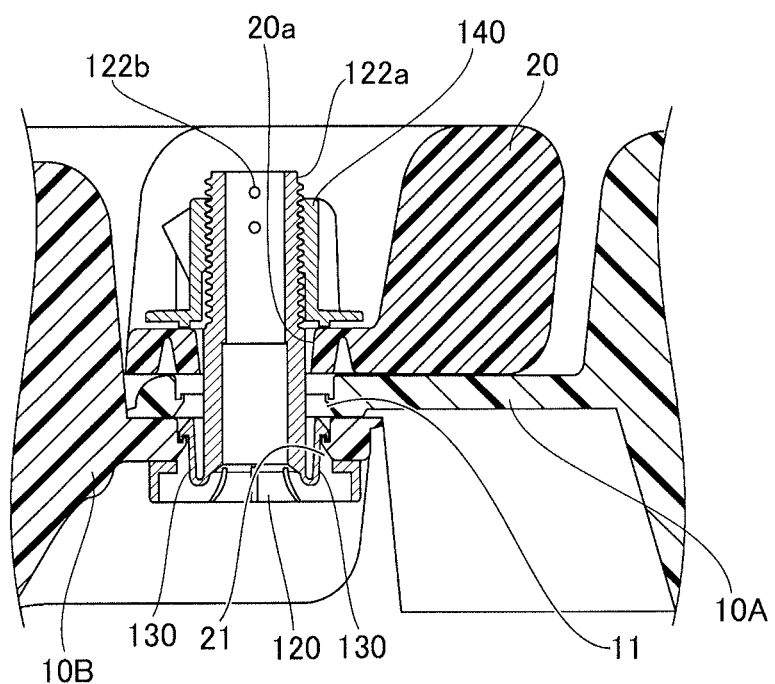
FIG. 26 is a cross-sectional view of a fastening structure in accordance with a fifth modification of the second embodiment.

As shown in FIG. 26, the fastening structure in accordance with the fifth modification of the second embodiment is basically similar to the fastening structure as shown in FIG. 24 except that the bushing 35 is omitted and the seat surface portion 143 of the female screw member 140 is in direct contact with the connection member 20.

Although the invention has been described with reference to the embodiments, the technical scope of the invention is not limited to the embodiments. It will be apparent to those skilled in the art that various modifications or improvements can be made to the embodiments. In view of the appended claims, it will be also apparent that the embodiments with such modifications or improvements are included in the technical scope of the invention.

REFERENCE SIGNS LIST 10, 10A, 10B solar panel float (object to be fastened)
11 first through-hole (through-hole)
12 opening
13 step
15 projection
20 connection member (object to be fastened)
21 second through-hole (through-hole)
22 opening
25 groove
30 male screw member
40 female screw member
41 female screw
42 body portion
46 projection
50 temporary fixing portion
52 deformable portion
53 locking portion
60 female screw member
61 female screw
62 insert part
70 female screw member
71 body portion
80 temporary fixing portion
81 deformable portion
82 locking portion
90 female screw member
91 body portion
100 temporary fixing portion
101 deformable portion
102 locking portion
110 cylindrical part (part with female screw)
111 female screw
120 male screw member
121 male screw
122 body portion
122a guide portion
130 temporary fixing portion
132 deformable portion
133 locking portion
135 barb portion
140 female screw member
141 body portion
(P) insertion direction
(Q) perpendicular direction

The invention claimed is:

1. A connection structure attached with solar panel floats, comprising a fastening structure for fastening by a pair of screw members an overlapped portion, the overlapped portion being a portion where two neighboring solar panel floats overlap or a portion where a connection member of connecting neighboring solar panel floats and a solar panel float overlap, wherein:
the pair of screw members comprises:
a female screw member threaded from above the overlapped portion; and
a male screw member mounted from below the overlapped portion and meshing with the female screw member,
the male screw member comprises:
a body portion at least partly inserted into a through-hole provided in a lower part of the overlapped portion;
a temporary fixing portion provided in a position adjacent to an end of the body portion and locked in the lower part of the overlapped portion so as to prevent the body portion from deviating from the through-hole during a fastening operation; and
a head portion provided at the end of the body portion, the body portion and the temporary fixing portion are integrally formed, the temporary fixing portion comprises:
- a deformable portion which is elastically inwardly deformable in a perpendicular direction perpendicular to the insertion direction; and
- a locking portion outwardly projecting from a leading end of the deformable portion in the perpendicular direction to be locked in an opening of the through-hole, the end of the body portion is an end opposite to a leading end of the body portion in an insertion direction in which the body portion is inserted, the deformable portion of the temporary fixing portion is connected to a portion provided on a side of the end of the body portion, and the deformable portion of the temporary fixing portion projects from the head portion to a side of the leading end of the body portion.

2. The connection structure attached with solar panel floats according to claim 1, wherein a plurality of the temporary fixing portions is arranged at substantially regular intervals in a circumferential direction of the body portion.

3. The connection structure attached with solar panel floats according to claim 1, wherein the locking portion comprises a barb portion at a leading end thereof, and the barb portion is locked in a projection which is formed at an inner edge of the opening of the through-hole.

4. The connection structure attached with solar panel floats according to claim 1, wherein the body portion comprises a guide portion formed as a smooth cylindrical surface in a leading end thereof to facilitate an insertion of the female screw member.

5. A connection structure attached with solar panel floats, comprising a fastening structure for fastening by a pair of screw members an overlapped portion, the overlapped portion being a portion where two neighboring solar panel floats overlap or a portion where a connection member of connecting neighboring solar panel floats and a solar panel float overlap, wherein:

the pair of screw members comprises:
- a male screw member threaded from above the overlapped portion; and
- a female screw member mounted from below the overlapped portion and meshing with the male screw member, the female screw member comprises:
- a body portion at least partly inserted into a through-hole provided in a lower part of the overlapped portion, the body portion including a pair of first portions and a pair of second portion,
  - the first portions of the body portion being provided adjacent to an end of the body portion and facing each other,
  - the second portions of the body portion being provided adjacent to the end of the body portion and facing each other,
  - the first and the second portions of the body portion being alternately arranged in a circumferential direction of the body portion; and
- a pair of temporary fixing portions provided in the pair of the first portions of the body portion and locked in the lower part of the overlapped portion so as to prevent the body portion from deviating from the through-hole during a fastening operation, the pair of temporary fixing portions being not provided in the second portions of the body portion, and the end of the body portion is a leading end of the body portion in an insertion direction in which the body portion is inserted a second width is longer than a first width,
- the first width is a width of the first portion of the body portion in the circumferential direction of the body portion,
- the second width is a width of the second portion of the body portion in the circumferential direction of the body portion, a second thickness is thicker than a first thickness,
- the first thickness is a thickness of a base side part of the temporary fixing portion, the base side part being connected to the first portion of the body portion,
- the second thickness is a thickness of the second portion of the body portion.

6. The connection structure attached with solar panel floats according to claim 5, wherein each of the temporary fixing portion comprises: a deformable portion which is elastically inwardly deformable in a perpendicular direction perpendicular to the insertion direction; and
a locking portion which outwardly projects from a leading end of the deformable portion in the perpendicular direction so as to be locked in an opening of the through-hole.

7. The connection structure attached with solar panel floats according to claim 5, wherein the body portion is configured to prevent a rotation of the body portion when the male screw member is threaded.

8. The connection structure attached with solar panel floats according to claim 7, wherein the body portion comprises a projection formed on an outer peripheral surface of the body portion in the insertion direction, and the projection is press-fitted into a groove portion provided in the through-hole to prevent the rotation of the body portion.

9. The connection structure attached with solar panel floats according to claim 8, wherein a plurality of the projections is arranged at substantially regular intervals in a circumferential direction of the body portion.

10. The connection structure attached with solar panel floats according to claim 7, wherein the body portion has a non-circular outer shape corresponding to the through-hole having a non-circular shape to prevent the rotation of the body portion.

11. The connection structure attached with solar panel floats according to claim 10, wherein the body portion has a substantially tetragonal outer shape.

12. The connection structure attached with solar panel floats according to claim 5, wherein the female screw member is formed by a synthetic resin molding.

13. The connection structure attached with solar panel floats according to claim 5, wherein the body portion comprises: a metallic insert part having a female screw; and a synthetic resin molding formed to surround the metallic insert part.

* * * * *